US008489518B2

(12) United States Patent
Levine et al.

(10) Patent No.: US 8,489,518 B2
(45) Date of Patent: Jul. 16, 2013

(54) SYSTEM AND METHOD FOR AUTHORIZATION AND DISCLOSURE FOR BACKGROUND INFORMATION SEARCHES

(76) Inventors: Michael B. Levine, Los Angeles, CA (US); Christopher Cirak, Venice, CA (US)

( * ) Notice: Subject to any disclaimer, the term of this patent is extended or adjusted under 35 U.S.C. 154(b) by 637 days.

(21) Appl. No.: 12/639,965

(22) Filed: Dec. 16, 2009

(65) Prior Publication Data
US 2010/0223192 A1  Sep. 2, 2010

Related U.S. Application Data

(60) Provisional application No. 61/138,120, filed on Dec. 16, 2008, provisional application No. 61/170,514, filed on Apr. 17, 2009.

(51) Int. Cl.
G06Q 10/10 (2012.01)
G06Q 10/06 (2012.01)
G06Q 30/08 (2012.01)
G06Q 10/00 (2012.01)
G06Q 30/02 (2012.01)

(52) U.S. Cl.
USPC .......................................................... 705/321

(58) Field of Classification Search
None
See application file for complete search history.

(56) References Cited

U.S. PATENT DOCUMENTS

| 6,714,944 B1* | 3/2004 | Shapiro et al. ......................... 1/1 |
| 2003/0204425 A1 | 10/2003 | Kennedy et al. |
| 2004/0107112 A1 | 6/2004 | Cotter |
| 2004/0186852 A1* | 9/2004 | Rosen ......................... 707/104.1 |
| 2004/0243428 A1* | 12/2004 | Black et al. ......................... 705/1 |
| 2006/0287970 A1* | 12/2006 | Chess et al. ......................... 707/1 |
| 2007/0143475 A1 | 6/2007 | Daigle |
| 2009/0327006 A1* | 12/2009 | Hansan et al. ..................... 705/7 |

OTHER PUBLICATIONS

International Search Report dated Feb. 26, 2010 for International Application PCT/US2009/068324, 2 sheets.

* cited by examiner

Primary Examiner — Jonathan Ouellette
(74) Attorney, Agent, or Firm — Christie, Parker & Hale, LLP

(57) ABSTRACT

A system and automated method for verification of employment history regarding a job applicant, the method including receiving information identifying an applicant, receiving employment history information for the job applicant, receiving information identifying an identified verification contact for verification of the employment history information, automatically providing the identified verification contact with a question pertaining to employment history information, receiving an answer from the identified verification contact, storing the answer.

14 Claims, 52 Drawing Sheets

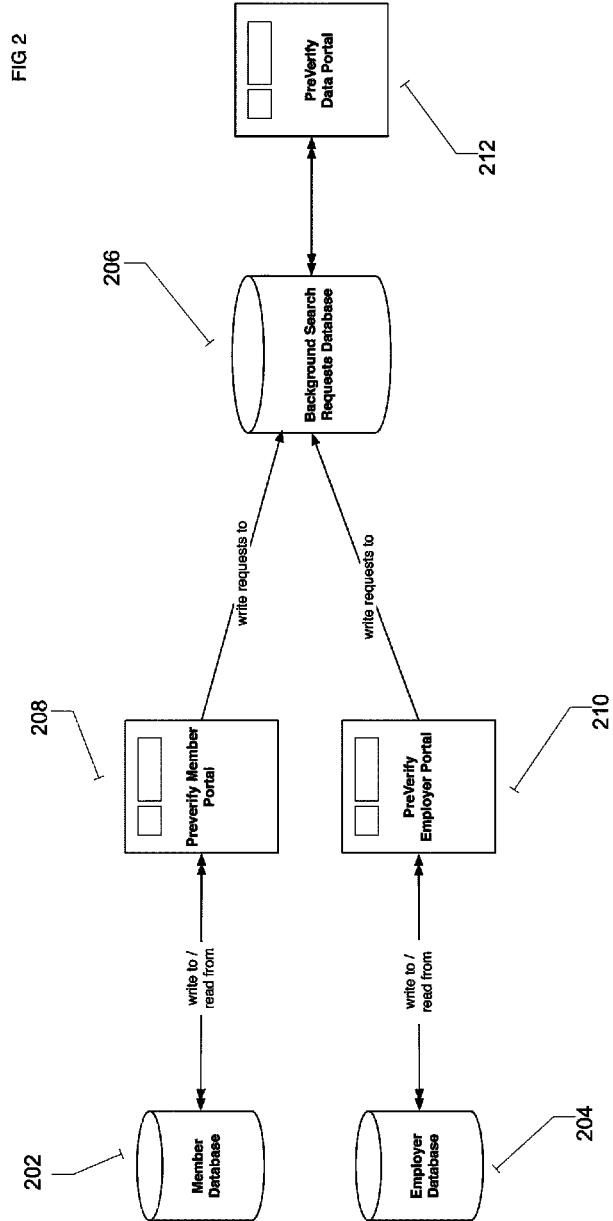

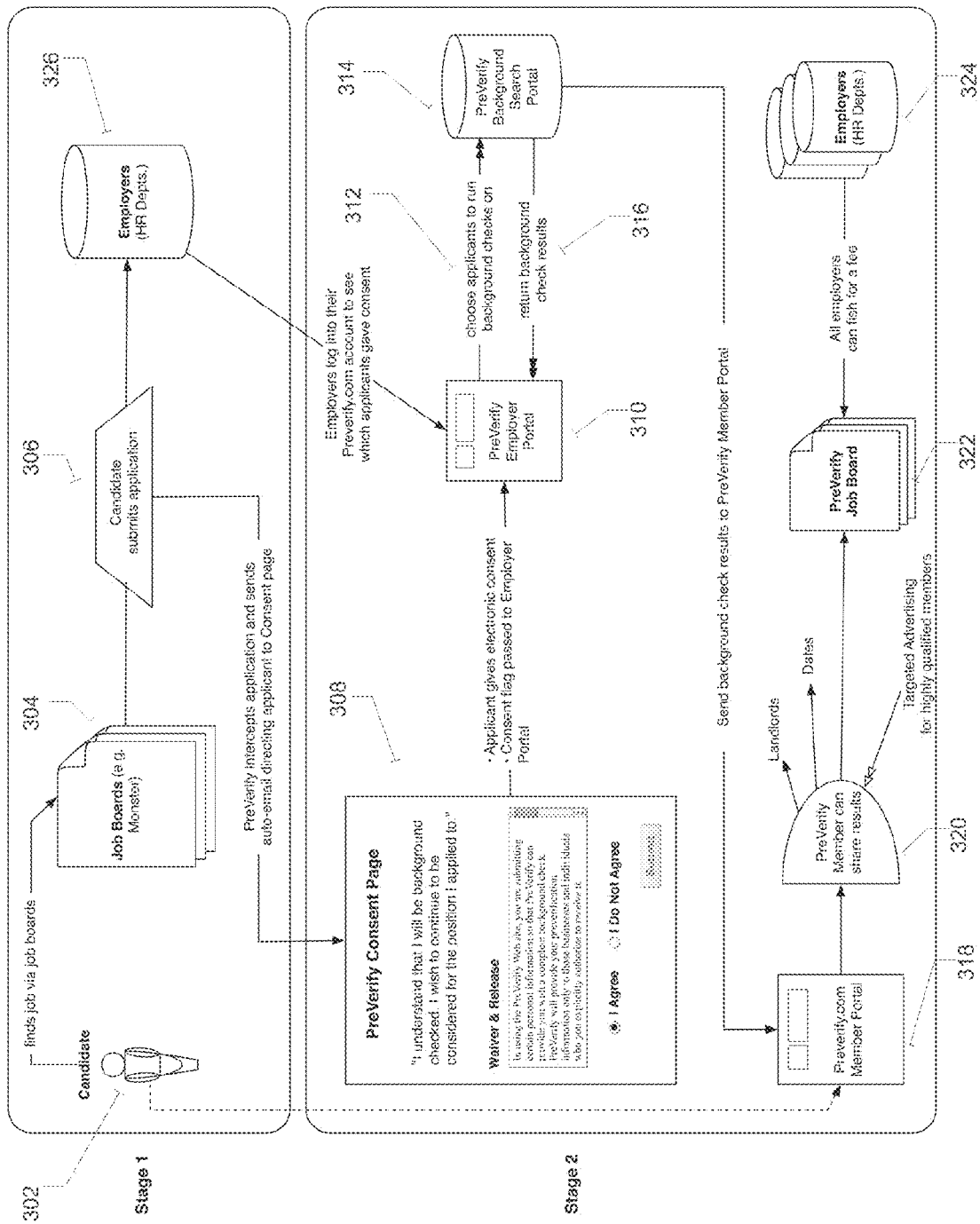

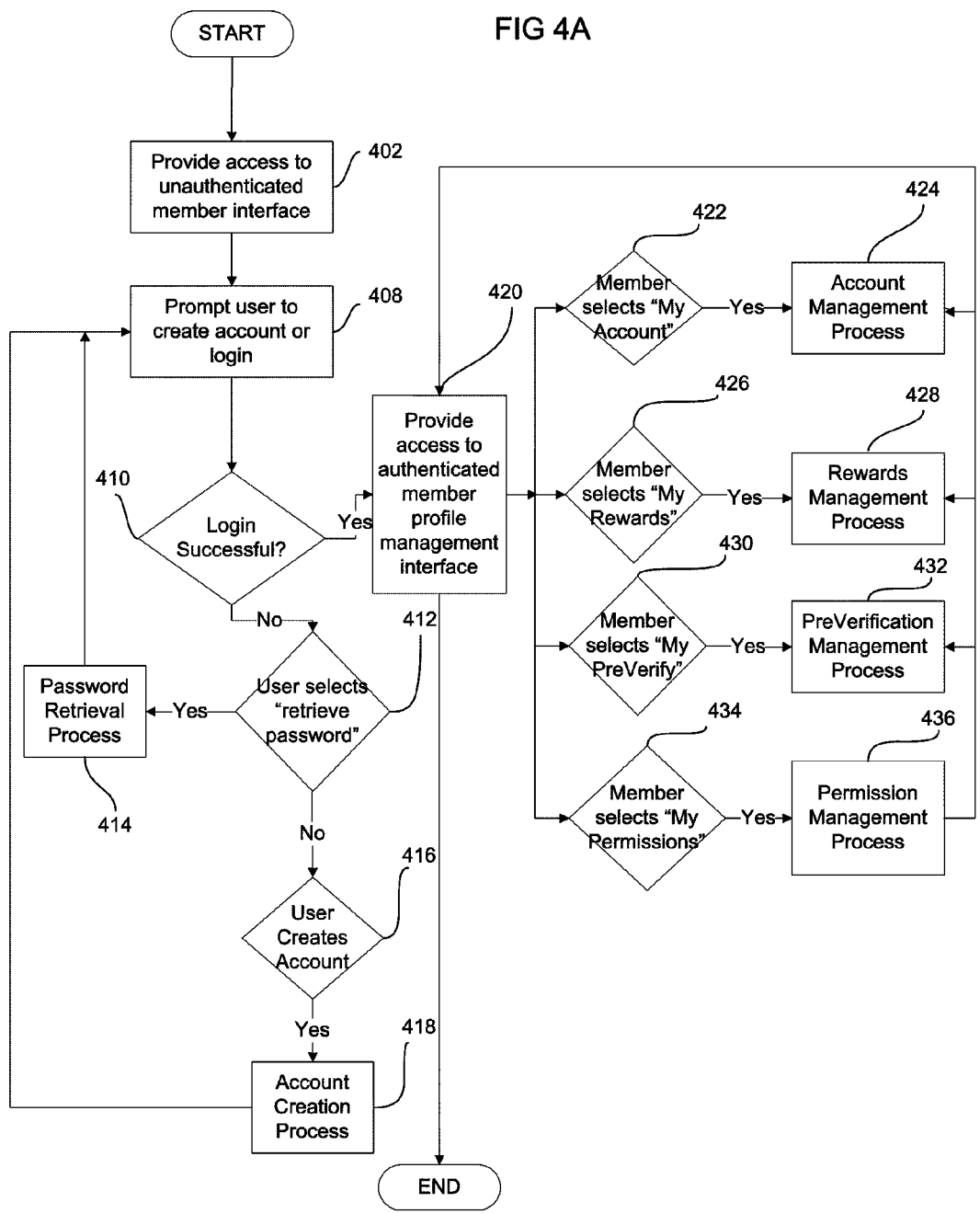

FIG 4C

THE PREVERIFY ADVANTAGE

PREVERIFY is the web's first and foremost background verification provider. When you PREVERIFY it's like saying "I'm legit". Got good credit? Proud of your education? PREVERIFY and rise above the crowd!

Overview | How it works | Services | FAQs

BEFORE

How can you stand out in the crowd?

PreVerify...

...will confirm your:
- ☑ Background Check
- ☑ Education History
- ☑ Employment History
- ☑ Professional licenses
- ... and much more!

AFTER

Stand out by getting PreVerified!

404

REGISTER NOW! *It's FREE!*

First Name

Last Name

Email (this will be your username)

Password (8 - 20 characters)

Confirm Password

Already a member? Log in       [SUBMIT]

406

USE PREVERIFY TO...
... get the best job offers!
... gain your clients' trust and business
... legitimize your online dating profile
... receive special, low-rate bank offers
... look up other Member Profiles

PREVERIFY NEWS
- Federal law requires background checks for all contractors
- Arizona Board of Edu. mandates that all teachers be screened
- MGM Las Vegas head resigns after lying about credentials...
- Tancy Corp CEO fired after lying on his resume about degree

PREVERIFY SUCCESS
"My clients know they can trust me."
- Susan N., Psychologist "My students' parents know they're in good hands."
- Richard S., Middle School Teacher "PreVerify gave me the credibility I needed to land the job of my dreams!" - Anton B., Business Analyst

FIG 4D

PREVERIFY MEMBER PROFILE for santa@clause.com
Click on each category's "show" link to see details.

PREVERIFIED
PREVERIFY.COM show / hide all details

| Status | Service | PreVerified on | Details | Request |
|---|---|---|---|---|
| ✓ | Education History | 10/03/07 | hide | |
| | B.A. Fordham University, Bronx, N.Y. 1982 | | | |
| | M.A. Columbia University, New York, N.Y. 1986 | | | |
| ✓ | Employment History | 06/12/07 | show | |
| not preverified | Credit Report | n/a | n/a | |
| ✓ | Driving Record | 12/22/06 | show | |
| not preverified | Address History | n/a | n/a | |
| not preverified | Criminal Background Check | n/a | n/a | |
| ✓ | Civil and Bankrupcy Records | 10/03/07 | show | |
| ✓ | Professional Licenses & Certs | 10/03/07 | show | |
| not preverified | References Check | n/a | n/a | |
| not preverified | Regulatory Sanctions | n/a | n/a | | print complete profile request

Print or email this Profilet

View preverified Detailst

Shows which information has been preverified

The user can request specific Preverifications from the member who's Profile they are viewing

FIG 4F

LOG IN

Username (your email)

Password  I forgot my password

NOT A MEMBER?
Click here to register

*Username or Password invalid* submit

ACCOUNT ACTIVATION

In order to preserve the integrity of your data and ensure it is genuine, an activation link has been sent to the email you entered during registration. Please check your email and click on the link to activate your PreVerify account. Once activated, you can log into your new PreVerify Member account.

FIG 4H

ACCOUNT ACTIVATION SUCCESSFUL!

Thank you for activating your account.
You can now log into your new PreVerify Member Account.

LOG IN

Username (your email)

Password  I forgot my password

NOT A MEMBER?
Click here to register

*Username or Password invalid*

Submit

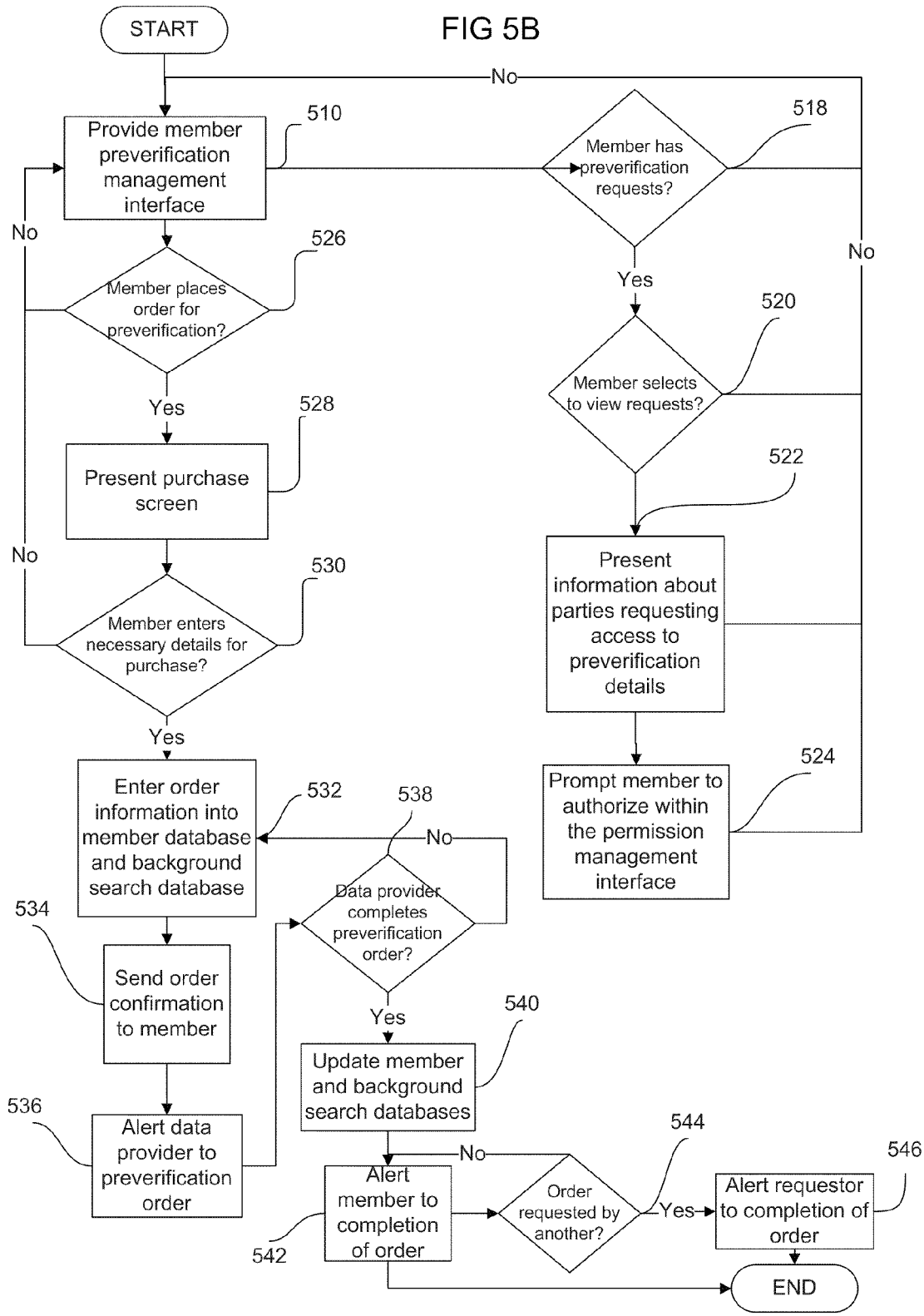

FIG 5C

PREVERIFY DASHBOARD

PROFILE LOOKUP: [enter member's email] [GO]

| My PreVerify | My Permissions | My Rewards | My Account |

MY PREVERIFY

| Status | | PreVerified on | Price | Buy/Renew |
|---|---|---|---|---|
| ✓ | Education History - info | view | 10/03/07 | $9.95 | valid for life |
| ✓ | Employment History - info | view | 06/12/07 | $9.95 | ☐ |
| not preverified | Credit Report - info | n/a | | $9.95 | ☐ |
| ✓ | Driving Record - info | view | 12/22/06 | $9.95 | ☐ |
| not preverified | Address History - info | n/a | | $19.95 | ☐ |
| 3 REQUESTS | Criminal Background Check - info | n/a | | $9.95 | ☐ |
| ✓ | Civil and Bankrupcy Records - info | view | 10/03/07 | $9.95 | ☐ |
| ✓ | Professional Licenses & Certs - info | view | 10/03/07 | $12.95 | ☐ |
| in progress | References Check - info | n/a | | $7.95 | request for free |
| in progress | Regulatory Sanctions - info | n/a | | | |

512 ← (pointing to 3 REQUESTS)
514 ← (pointing to table area)

TOTAL PACKAGE SPECIAL - $79.95
All available verifications at a special price!
☑ Includes all available verifications
☑ Exclusive Job Board access!
[buy now]

AUTO-RENEWAL SPECIAL - $29.95
Keep your Profile up-to-date!
☑ Includes all available verifications with monthly auto-renewal
☑ Exclusive Job Board access
☑ Platinum Member Privileges
[buy now]

516

USE PREVERIFY TO...
... get the best job offers!
... gain your clients' trust and business
... legitimize your online dating profile
... receive special, low-rate bank offers
... many more PreVerify membership benefits

PREVERIFY JOB BOARD
· Search exclusive job listings
· Exposure to the best employers
· Lorem ipsum dolores selm canasit
· Lorem ipsum dolores selm canasit

*New!*
[Take Me There]

PREVERIFY SUCCESS
"My clients know they can trust me."
- *Susan N., Psychologist*

"My students' parents know they're in good hands."
- *Richard S., Middle School Teacher*

"PreVerify gave me the credibility I needed to land the job of my dreams!" - *Anton B., Business Analyst*

Log out

PREVERIFY DASHBOARD

PROFILE LOOKUP: (enter member's email) GO

| My PreVerify | My Permissions | My Rewards | My Account |

PREVERIFY ORDER CONFIRMATION
Username: john@doe.com

Thank you! Your order has been received.

You will start receiving feedback within the next 24-48 hrs, so log into your PreVerify account often.

[Back to Profile]

USE PREVERIFY TO...
... get the best job offers!
... gain your clients' trust and business
... legitimize your online dating profile
... receive special, low-rate bank offers
... many more PreVerify membership benefits

PREVERIFY JOB BOARD
- Search exclusive job listings
- Exposure to the best employers
- No more waiting in the back of the line

*New!* [Take Me There]

PREVERIFY SUCCESS
"My clients know they can trust me."
- *Susan N., Psychologist*
"My students' parents know they're in good hands."
- *Richard S., Middle School Teacher*
"PreVerify gave me the credibility I needed to land the job of my dreams!" - *Anton B., Business Analyst*

FIG 5F

EDUCATION HISTORY

HIGH SCHOOL

| Name | City | Country | Degree? | |
|---|---|---|---|---|
| High School Name | High School City | High School Country | Yes | |

COLLEGE / UNIVERSITY

| Name | City | Country | Degree? | Major | GPA |
|---|---|---|---|---|---|
| College Name | College City | College Country | Yes | Major | GPA |

GRADUATE SCHOOL (U.S. Only)

| Name | City | Country | Degree? | Major | GPA |
|---|---|---|---|---|---|
| Graduate School Name | Graduate School City | Graduate Country | Yes | Major | GPA | close

FIG 5G

EMPLOYMENT HISTORY

| EMPLOYER 1 | EMPLOYER 2 | EMPLOYER 3 | EMPLOYER 4 | EMPLOYER 5 | EMPLOYER 6 | EMPLOYER 7 | EMPLOYER 8 |

Name
*Employer Name*

City
*Employer City*

Country
*Employer Country*

Telephone #
*Employer Phone*

Dates of Employment
*1/1/1997 to 2/3/2001*

Job Title
*Job title*

Supervisor
*Supervisor name*

Reason for leaving
*Reason for leaving*

Work Performed
*Job duties here* close

FIG 5I

DRIVING RECORD

DUI in 2006, reduced to a misdemeanor
No other moving violations

FIG 5J

ADDRESS HISTORY

| ADDRESS 1 | ADDRESS 2 | ADDRESS 3 | ADDRESS 4 | ADDRESS 5 | ADDRESS 6 | ADDRESS 7 | ADDRESS 8 | ADDRESS 9 |

| Street Address | City | State | Zip Code | Dates |
|---|---|---|---|---|
| 123 Main Street | Los Angeles | CA | 12345 | 1/5/1995 to 10/6/2001 |

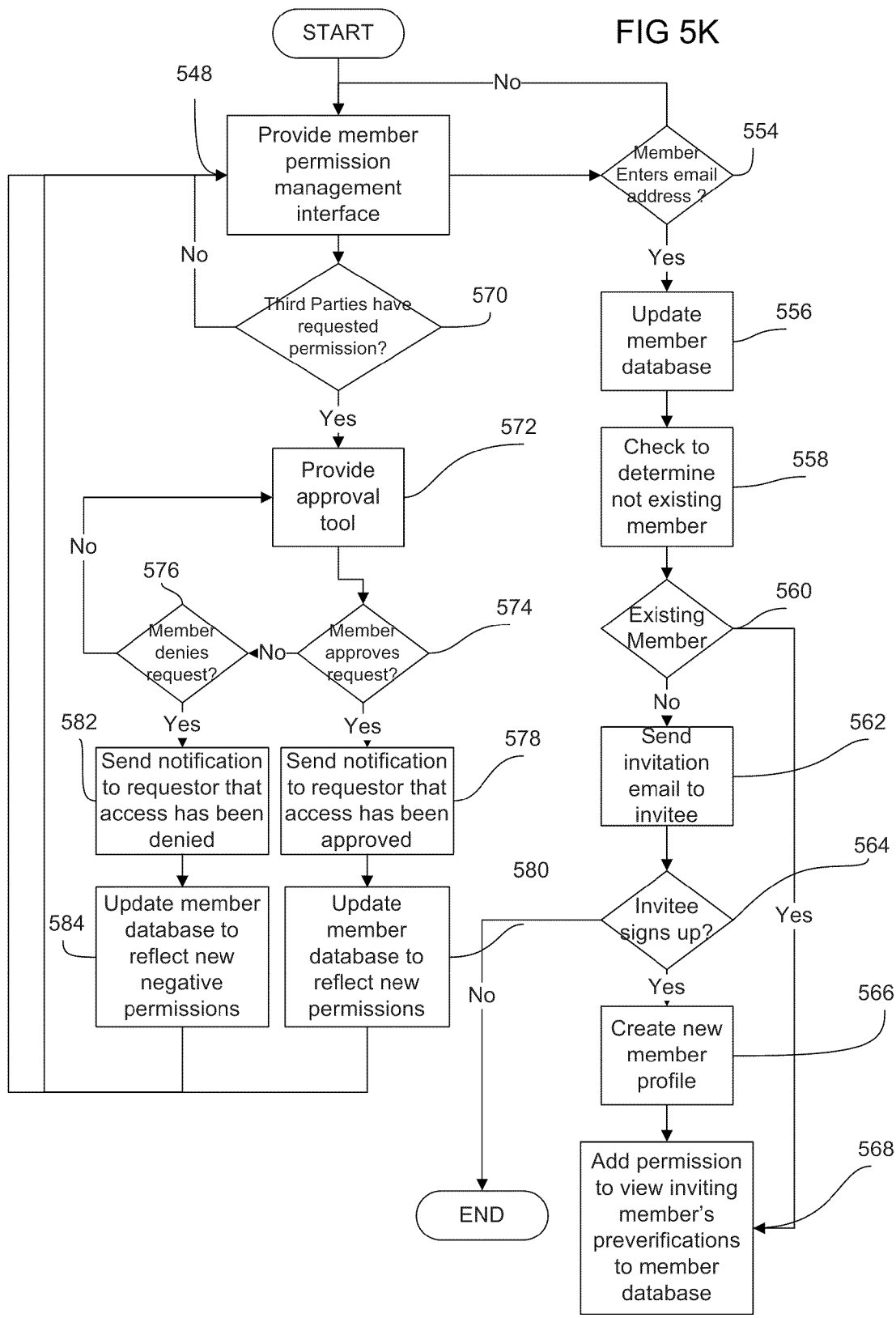

FIG 5L

PREVERIFY DASHBOARD
550

| My PreVerify | My Permissions | My Rewards | My Account |

PROFILE LOOKUP: (enter member's email) [GO]

INVITED LIST
Enter emails of members you would like to make your profile visible to.
An auto email will be sent to anyone you add, inviting them to view your profile.

[ ] [add]

A B C D E F G H I J K L M N O P Q R S T U V W X Y Z

| bill@microsoft.com | remove |
| bobby@darin.com | remove |

REQUESTS
The following Preverify members have requested to see your profile.
An auto email will be sent to anyone you approve or deny.

552

| Tony Soprano | tony@sopranos.com | approve  deny |
| Gabe Kotter | kotter@welcomeback.com | approve  deny |

---

PREVERIFY JOB BOARD
- Search exclusive job listings
- Exposure to the best employers
- No more waiting in the back of the line

*New!*

PREVERIFY SUCCESS
"My clients know they can trust me."
- *Susan N., Psychologist*
"My students' parents know they're in good hands."
- *Richard S., Middle School Teacher*
"PreVerify gave me the credibility I needed to land the job of my dreams!" - *Anton B., Business Analyst*

USE PREVERIFY TO...
... get the best job offers!
... gain your clients' trust and business
... legitimize your online dating profile
... receive special, low-rate bank offers
... many more PreVerify membership benefits

FIG 5N

PREVERIFY DASHBOARD

PROFILE LOOKUP: [enter member's email] [Go]

My PreVerify | My Permissions | My Rewards | My Account

MY REWARDS
Good deeds get noticed! Select a category and view your special offers:

CATEGORIES
- autos
- personal finance
- home & garden
- employment
- entertainment
- personals
- real estate
- sports
- technology
- travel
- insurance
- shopping
- healthcare
- legal help
- shopping

590A

Did you know...
You get increasingly better offers as you become more PreVerified.

Good offers ←You are here→ Best offers
You have 6 out of 10 PreVerifications.

PERSONAL FINANCE

BANK ACCOUNTS

| Financial Institution | Your offer |
|---|---|
| 1. Bank of America | Free Checking Account + $5 to start |
| 2. eTrade | 10 Free trades |
| 3. Lorem Ipsum Company | lorem ipsum offer |
| 4. Lorem Ipsum Company | lorem ipsum offer |

590B

[ad space - per category]
advertisers bid on premier positioning

CREDIT CARDS

| Financial Institution | Your offer |
|---|---|
| 1. Bank of America | 0% interest on balance transfers |
| 2. Citibank | No annual membership |
| 3. Lorem Ipsum Company | lorem ipsum offer |
| 4. Lorem Ipsum Company | lorem ipsum offer |

590C

[ad space - per category]
advertisers bid on premier positioning

590D

PREVERIFY JOB BOARD    *New!*
- Search exclusive job listings
- Exposure to the best employers
- No more waiting in the back of the line

USE PREVERIFY TO...
... get the best job offers!
... gain your clients' trust and business
... legitimize your online dating profile
... receive special, low-rate bank offers
... many more PreVerify membership benefits

PREVERIFY SUCCESS
"My clients know they can trust me."
- Susan N., Psychologist "My students' parents know they're in good hands."
- Richard S., Middle School Teacher "PreVerify gave me the credibility I needed to land the job of my dreams!" - Anton E., Business Analyst

FIG 50

PREVERIFY NEWS

12/12/09 New Tool for Job Seekers
Job seekers have a new tool available to help put them at the top of the interview list when applying to new positions. PreVerify, www.preverify.com, launched in June 2009 and is a free tool with which job seekers can conduct their own accurate and professional employment verifications.

12/03/09 PreVerify for Companies
For companies looking to hire people, PreVerify is an invaluable tool. Instead of paying a background search company an average of $15.00 per employer to verify a job applicant's prior employment history, prospective employers can simply direct applicants to use the PreVerify website.

12/01/09 Jump to the Front of the Line
PreVerify, www.preverify.com, is a simple and free tool with a wide variety of uses, not only in the job market but in your personal life as well. By becoming PreVerify'd, you are telling prospective employers, financiers or anyone else that you are a prime and upstanding candidate and you will no doubt be taken seriously from the start.

FIG 5P

PREVERIFY DASHBOARD

PROFILE LOOKUP: [(enter member's email)] [GO]

My PreVerify | My Permissions | My Rewards | My Account

ACCOUNT NAME
First Name
Last Name
[save]

CHANGE EMAIL
Current Email (your username)
New Email (this will be your new username)
Confirm New Email
[save]

CHANGE PASSWORD
Old Password (8-20 characters)
New Password (8-20 characters)
Confirm Password
[save]

USE PREVERIFY TO....
... get the best job offers!
... gain your clients' trust and business
... legitimize your online dating profile
... receive special, low-rate bank offers
... many more PreVerify membership benefits

PREVERIFY JOB BOARD *New!*
- Search exclusive job listings
- Exposure to the best employers
- No more waiting in the back of the line

PREVERIFY SUCCESS
"My clients know they can trust me."
 - *Susan N., Psychologist*
"My students' parents know they're in good hands."
 - *Richard S., Middle School Teacher*
"PreVerify gave me the credibility I needed to land the job of my dreams!" - *Anton B., Business Analyst*

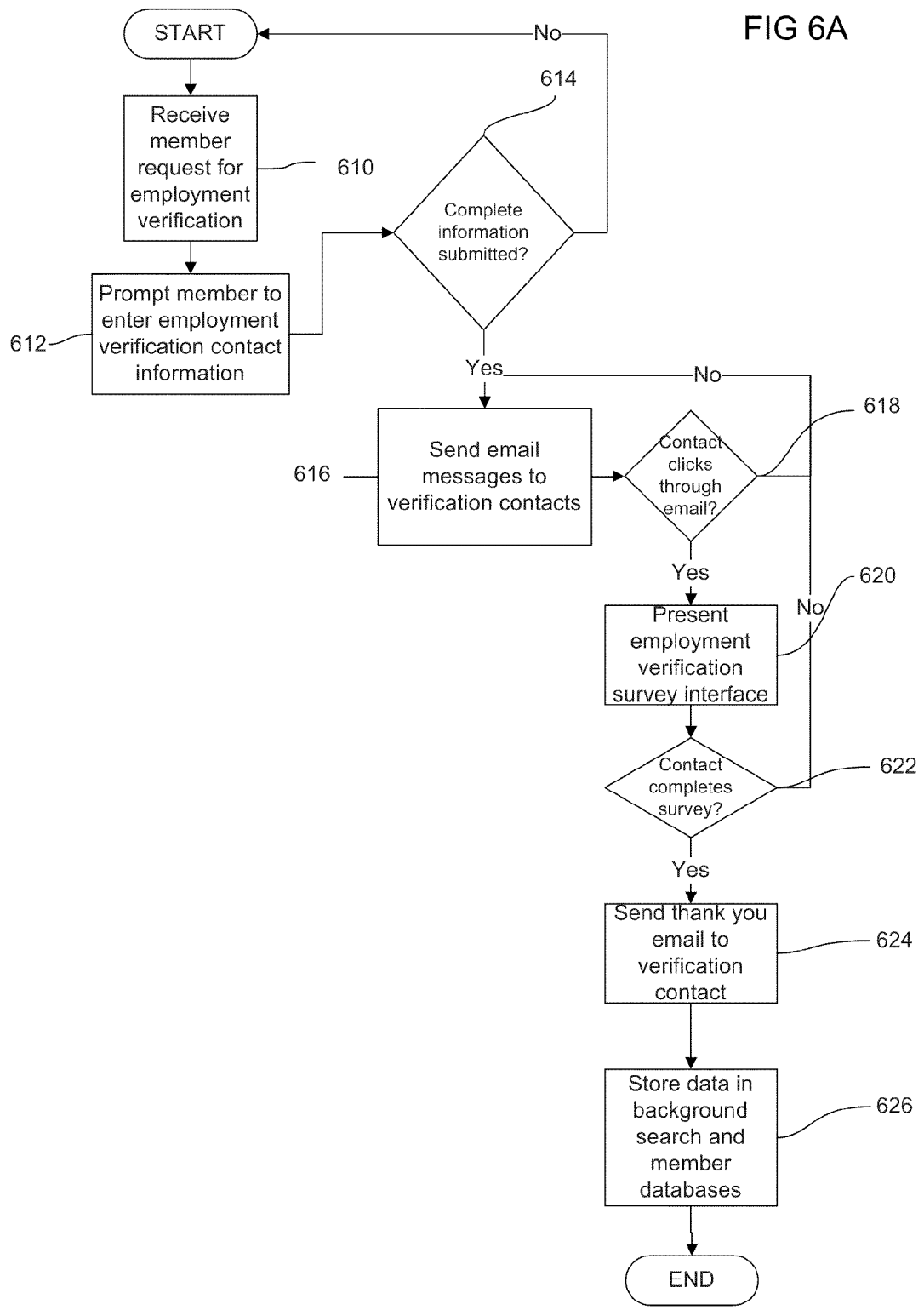

EMPLOYMENT CHECK
Click "add another job" to add up to 10 employers.

Former Employer Name          City                          Country                          Telephone Job Title                     Dates of Employment           Supervisor Name                  Supervisor Email
                              mm / yyyy  to  mm / yyyy Work Performed                                              Reason for leaving add another job Salary
         ⦿ annually  ○ monthly ☐ I hereby authorize PreVerify to request any information pertaining to my work
  performance. I unconditionally release PreVerify from any and all liability that
  might result from any information furnished to PreVerify.

submit employment verification request

Dear [former supervisor name],

I am sending you this request through PreVerify for an Employment Verification. I would appreciate if you could provide a Reference. Please take a few minutes to provide this information by clicking here.

Best,
[Former employee name]

FIG 6D

Employment Verification Form

Dear [former supervisor name],

Your former employee [employee name] has requested that you complete the following Employment Verification form.
This applicant has provided us with written authorization to thoroughly investigate all references listed on his/her application for employment.
You therefore are authorized to disclose to us all letters, reports, and other information related to his/her work records. To view the authorization, click here.

☐ OUR COMPANY POLICY IS TO VERIFY DATES OF EMPLOYMENT AND JOB TITLE ONLY

Employment Verification for [former employee name]

| Name | City | Country | Telephone # |
|---|---|---|---|
| Employer Name | Employer City | Employer Country | Employer Phone |
| Dates of Employment | Job Title | Supervisor | Reason for leaving |
| 1/1/1997 to 2/3/2001 | Job title | name | Reason for leaving |
| Work Performed | | | |
| Job duties here. | | | |

Is the information provided above correct?  ◉ Yes  ○ No
If no, please correct:

| | Excellent | Very Good | Average | Not Acceptable |
|---|---|---|---|---|
| Appearance | ○ | ○ | ○ | ○ |
| Attendance | ○ | ○ | ○ | ○ |
| Punctuality | ○ | ○ | ○ | ○ |
| Quality of Work | ○ | ○ | ○ | ○ |
| Productivity | ○ | ○ | ○ | ○ |
| Job Knowledge | ○ | ○ | ○ | ○ |
| Accuracy | ○ | ○ | ○ | ○ |
| Adaptability | ○ | ○ | ○ | ○ |
| Initiative | ○ | ○ | ○ | ○ |
| Dependability | ○ | ○ | ○ | ○ |

Would rehire?  ◉ Yes  ○ No

Name of person completing this reference check

[Submit]

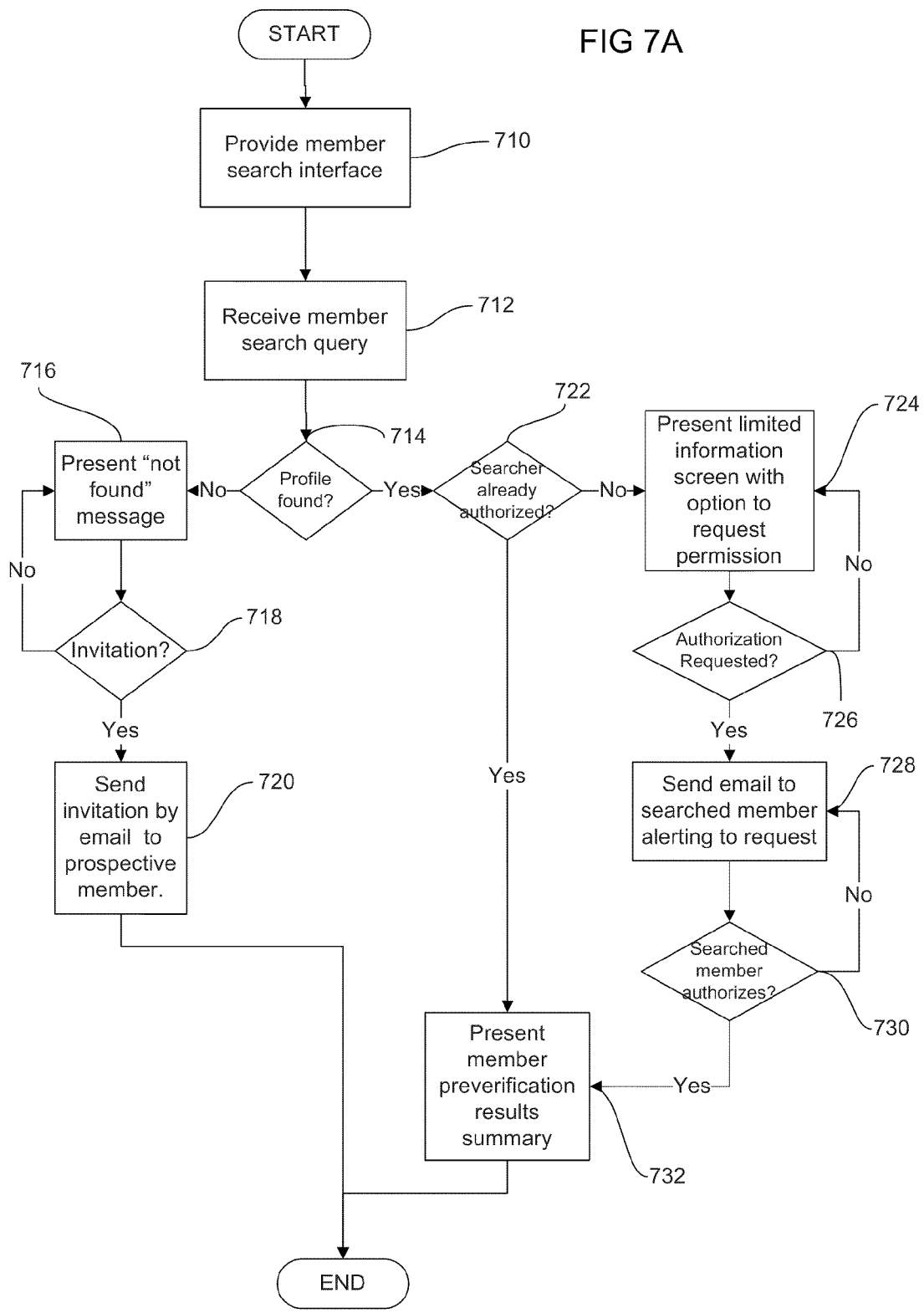

FIG 7C

View preverified Detailst

Shows which information has been preverified

The user can request specific Preverifications from the member who's Profile they are viewing

PREVERIFY MEMBER PROFILE for santa@clause.com
Click on each category's "show" link to see details.

| Status | Service | PreVerified on | Details | Request |
|---|---|---|---|---|
| √ | Education History | 10/03/07 | hide | |
| | B.A. Fordham University, Bronx, N.Y. 1982 | | | |
| | M.A. Columbia University, New York, N.Y. 1986 | | | |
| √ | Employment History | 06/12/07 | show | |
| not preverified | Credit Report | n/a | n/a | |
| √ | Driving Record | 12/22/06 | show | |
| not preverified | Address History | n/a | n/a | |
| not preverified | Criminal Background Check | 10/03/07 | show | |
| √ | Civil and Bankruptcy Records | 10/03/07 | show | |
| √ | Professional Licenses & Certs | n/a | n/a | |
| not preverified | References Check | n/a | n/a | |
| not preverified | Regulatory Sanctions | | | request | print complete profile   email complete profile

Print or email this Profilet

FIG 7D

PREVERIFY REQUEST: BACKGROUND CHECK

Requests are removed once PreVerification has been purchased.
All requests expire after 30 days.

10/13/07
Tom Kawani
*tkawani@yahoo.com*

10/13/07
mary klein
*mklein@earthlink.net*

10/13/07
Zultan Fugari
*zenmaster@msn.com* add "Background Check" to cart

FIG 7E

PREVERIFY MEMBER PROFILE for santa@clause.com
Click on each category's "show" link to see details.

| Status | Service | PreVerified on | Details | Request |
|---|---|---|---|---|
| ✓ | Education History | 10/03/07 | hide | |
| | B.A. Fordham University, Bronx, N.Y. 1982 | | | |
| | M.A. Columbia University, New York, N.Y. 1986 | | | |
| ✓ | Employment History | 06/12/07 | show | |
| not preverified | Credit Report | n/a | n/a | |
| ✓ | Driving Record | 12/22/06 | show | |
| not preverified | Address History | n/a | n/a | |
| not preverified | Criminal Background Check | n/a | n/a | |
| ✓ | Civil and Bankrupcy Records | 10/03/07 | show | |
| ✓ | Professional Licenses & Certs | 10/03/07 | show | |
| not preverified | References Check | n/a | n/a | |
| not preverified | Regulatory Sanctions | n/a | n/a | | print complete profile    email complete profile                    request

FIG 8A

Home | Contact Us | Login

PREVERIFY FOR EMPLOYERS

Overview | Solutions | Services | FAQ

QUALITY OVER QUANTITY
Preverify's candidate pool doesn't swamp you with millions of resumes to sift through - only the best and most qualified individuals. Lorem Ipsum rabitur norum soltore cum lorem ipsum dolor sit amet.

SAVE TIME AND MONEY
Lorem Ipsum rabitur norum soltore cum lorem ipsum dolor sit amet.

SOPHISTICATED MATCHING TOOLS
Our matching tools will make your job easier by automatically notifying you when a potential candidate has joined. Lorem Ipsum rabitur norum soltore cum lorem ipsum dolor.

PART OF AN EXCLUSIVE PART
Lorem Ipsum rabitur norum soltore cum lorem ipsum dolor sit amet.

CONTACT US!
First Name
Last Name
Company
Email
Phone
Already a member? Log In    SUBMIT

PREVERIFY NEWS
Federal law requires backgorund checks for all contracts...

Arizona Board of Education mandates that all teachers be screened...

PREVERIFY FOR EMPLOYERS
Want access to the most qualified applicant pool on the web? Visit the PreVerify Job Board and fish from a pool of the most qualified individuals... with clean criminal backgrounds!
CONTACT US

PREVERIFY SUCCESS STORIES
"My clients know they can trust me."
- Susan N., Psychologist "My students' parents know they're in good hands."
- Richard S., Middle School Teacher "PreVerify gave me the credibility I needed to land the job of my dreams!" - Anton B., Business Analyst

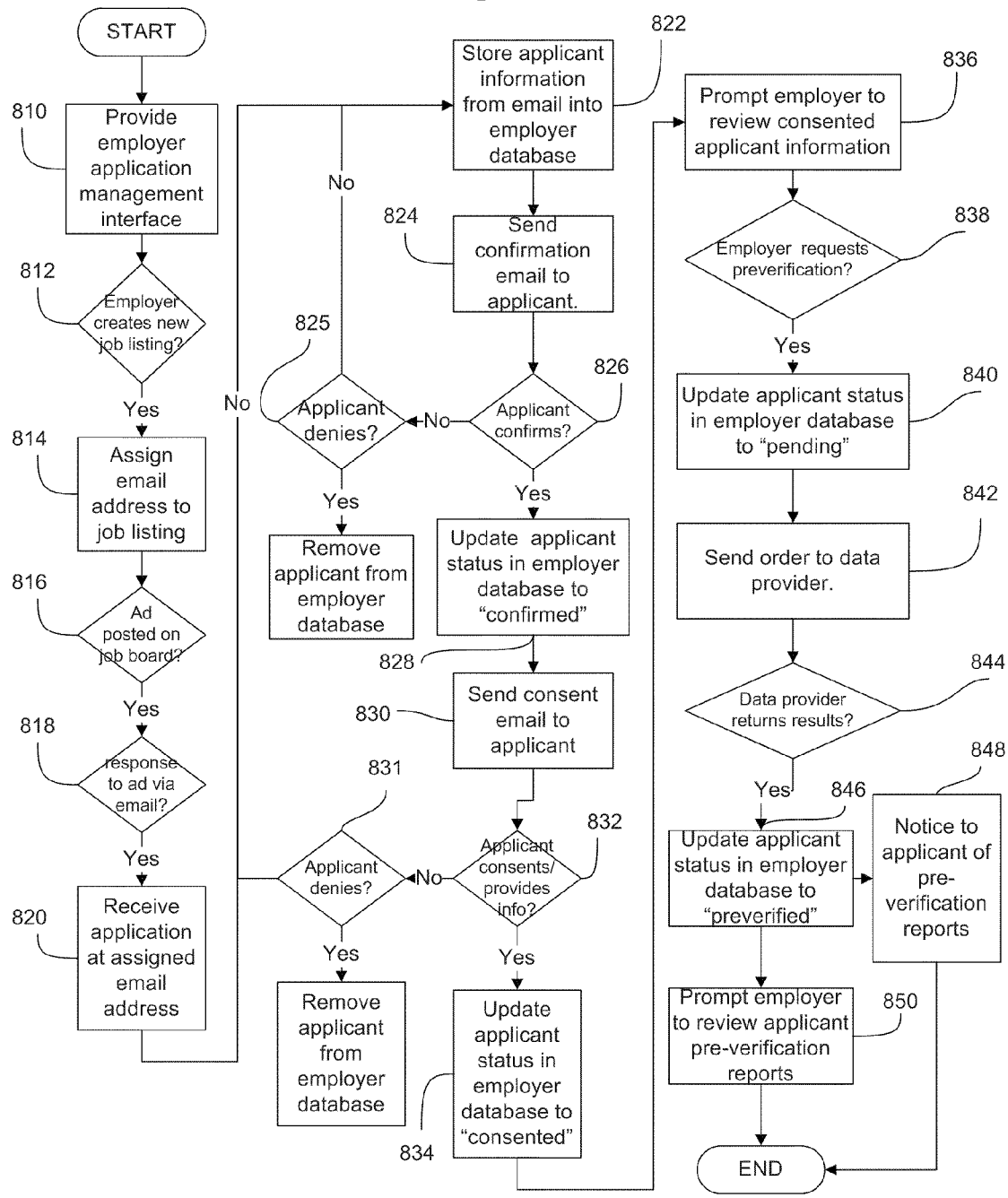

FIG 8D

Welcome, [employer name]!

Home | Contact Us | Log out

Applicants | My Settings | My Account

Sort by last name    SHOW: ● all applicants  ● confirmations only  ● consents only  ● pending only  ● preverified only  ● new applicants only

A B C D E F G H I J K L M N O P Q R S T U V W X Y Z

Send Direct Invite

| Expires | Name | Email | Resume | Application Received | Consent Given | Status | Next Step |
|---------|------|-------|--------|----------------------|---------------|--------|-----------|
| 06/11/07 | Last, First | peter_smith@msn.com | n/a | 06/11/07 | n/a | verification pending | preverify again |
| 06/11/07 | Last, First | peter_smith@msn.com | download | 06/11/07 | 06/12/07 | view results | preverify again |
| 06/11/07 | Last, First | peter_smith@msn.com | download | 06/11/07 | 06/12/07 | view results | preverify again |
| 06/11/07 | Last, First | peter_smith@msn.com | n/a | 06/11/07 | n/a | consent pending | resend |
| 06/11/07 | Last, First | peter_smith@msn.com | download | 06/11/07 | 06/12/07 | view results | preverify again |
| 06/11/07 | Last, First | peter_smith@msn.com | download | 06/11/07 | 06/12/07 | view results | preverify again |
| 06/11/07 | Last, First | peter_smith@msn.com | n/a | 06/11/07 | n/a | consent received | resend |
| 06/11/07 | Last, First | peter_smith@msn.com | n/a | 06/11/07 | n/a | n/a | resend |
| 06/11/07 | Last, First | peter_smith@msn.com | download | 06/11/07 | 06/12/07 | view results | preverify again |
| 06/11/07 | Last, First | peter_smith@msn.com | download | 06/11/07 | 06/12/07 | view results | preverify again |

PREVERIFY NEWS

Federal law requires background checks for all contracts...

Arizona Board of Education mandates that all teachers be screened...

PREVERIFY FOR EMPLOYERS

Want access to the most qualified applicant pool on the web? Visit the PreVerify Job Board and fish from a pool of the most qualified individuals... with clean criminal backgrounds!

CONTACT US

PREVERIFY SUCCESS STORIES

"My clients know they can trust me."
- Susan N., Psychologist

"My students' parents know they're in good hands."
- Richard S., Middle School Teacher "PreVerify gave me the credibility I needed to land the job of my dreams!" - Anton B., Business Analyst

FIG 8E

SEND DIRECT INVITATION

| | First Name | Last Name | Email |
|---|---|---|---|
| 1. | | | |
| 2. | | | |
| 3. | | | |
| 4. | | | |
| 5. | | | |
| 6. | | | |
| 7. | | | |
| 8. | | | |
| 9. | | | |
| 10. | | | |

SUBMIT

FIG 8F

Dear Applicant,

Thank you for applying for the Assistant to _____ position. Your application has been received.

Please note that in order to be considered for this positions you will be required to undergo a thorough background screening.

If you still wish to be considered, please click here.

Best,
[Employer name]

FIG 8G

PREVERIFY MEMBER PROFILE for santa@clause.com

PREVERIFIED
PREVERIFY.COM

Click on each category's "view" link to see details.

| Details | PreVerified on |
|---|---|
| Education History | |
| B.A. Fordham University, Bronx, N.Y. 1982 | 10/03/07 |
| M.A. Columbia University, New York, N.Y. 1986 | |
| Employment History | |
| Employment History details here | 10/03/07 |
| Address History | |
| Address History details here | 10/03/07 |
| References Check | |
| Reference Check details here | 10/03/07 |

FIG 8H

Welcome, [employer name]!

| Applicants | My Settings | My Account |

FORWARDING EMAIL
[edit]

CONSENT LEVEL
● Low - Consent form requires only confirmation click.
○ Med - Consent form requires First Name, Last Name and Resume
○ High - Consent form requires First Name, Last Name, Date of Birth, SSN and Resume.

AUTO-RESPONSE EMAIL
From Address
Subject
Body

[edit]

DIRECT INVITATION EMAIL
From Address
Subject
Body

[edit]

PREVERIFY NEWS
Federal law requires backgorund checks for all contracts...

Arizona Board of Education mandates that all teachers be screened...

PREVERIFY FOR EMPLOYERS
Want access to the most qualified applicant pool on the web? Visit the PreVerify Job Board and fish from a pool of the most qualified individuals... with clean criminal backgrounds!    [CONTACT US]

PREVERIFY SUCCESS STORIES
"My clients know they can trust me."
- Susan N., Psychologist
"My students' parents know they're in good hands."
- Richard S., Middle School Teacher
"PreVerify gave me the credibility I needed to land the job of my dreams!" - Anton B., Business Analyst

FIG 8J

Welcome, [employer name]!

Candidates | My Stats | My Settings | My Account

EMAIL FORWARDING
☐ Enable forwarding of email applications
[        ]  edit

ATS REDIRECT
☐ Enable ATS redirect

● Single Landing Page    LINK
[                                                    ]  save ○ Multiple Landing Pages
JOB ID       JOB TITLE                          ATS LINK
[    ]       [                            ]     [              ]  remove
[    ]       [                            ]     [              ]  remove
[    ]       [                            ]     [              ]  remove
[    ]       [                            ]     [              ]  remove
                                                             add

CONSENT LEVEL
● Low - Consent form requires only confirmation click.
○ Med - Consent form requires First Name, Last Name and Resume
○ High - Consent form requires First Name, Last Name, Date of Birth, SSN and Resume.

AUTO-RESPONSE EMAIL
From Address
[              ]
Subject
[              ]
Body
[                                              ]
                                            edit

DIRECT INVITATION EMAIL
From Address
[              ]
Subject
[              ]
Body
[                                              ]
                                            edit

FIG 8K

Home | Contact Us | Log out

Welcome, [employer name]!

[Candidates] [My Stats] [My Settings] [My Account]

EMAIL FORWARDING
☐ Enable forwarding of email applications

ATS REDIRECT
☐ Enable ATS redirect

● Single Landing Page    LINK

○ Multiple Landing Pages

| JOB ID | JOB TITLE | ATS LINK | |
|---|---|---|---|
|  |  |  | remove |
|  |  |  | remove |
|  |  |  | remove |
|  |  |  | remove |

CONSENT LEVEL
● Low - Consent form requires only confirmation click.
○ Med - Consent form requires First Name, Last Name and Resume
○ High - Consent form requires First Name, Last Name, Date of Birth, SSN and Resume.

SELECTIVE FILTERING
☐ Enable Selective Filtering

● Show Consent Pages
to candidates who do not have the following preverifications:

Not older than:
☑ Criminal Background Check — any
☑ Education History — 3 months
☐ Employment History — 6 months
☐ Driving Record — 1 year
☑ Professional licenses — 6 months
☐ Credit Check — 6 months
☑ Address History — 6 months
☑ Civil & Bankruptcy — 6 months
☑ Regulatory Sanctions — 6 months ○ Block Candidates
who do not have the following preverifications:

Not older than:
☑ Criminal Background Check — any
☑ Education History — 3 months
☑ Employment History — 6 months
☑ Driving Record — 1 year
☐ Professional licenses — 6 months
☑ Credit Check — 6 months
☐ Address History — 6 months
☐ Civil & Bankruptcy — 6 months
☐ Regulatory Sanctions — 6 months

AUTO-RESPONSE EMAIL
From Address

Subject

Body

DIRECT INVITATION EMAIL
From Address

Subject

Body

FIG 9C

Welcome, [data provider name]!

1 = Education History
2 = Driving Record
3 = Credit Report

4 = Address History
5 = Employment History
6 = Criminal Background

7 = Civil/Bankrupcy Records
8 = Professional Licences/Certs
9 = References Check 10 = Regulatory Sanctions Orders | My Account

| Date Received | Name | SSN | Date of Birth | Resume | Verifications | Action |
|---|---|---|---|---|---|---|
| 06/11/07 | Last, First | 111-22-3333 | 06/11/07 | n/a | 3,8,9 | edit |
| 06/11/07 | Last, First | 111-22-3333 | 06/11/07 | download | 3,8,9 | edit |
| 06/11/07 | Last, First | 111-22-3333 | 06/11/07 | download | 3,8,9 | edit |
| 06/11/07 | Last, First | 111-22-3333 | 06/11/07 | n/a | 3,8,9 | edit |
| 06/11/07 | Last, First | 111-22-3333 | 06/11/07 | download | 3,8,9 | edit |
| 06/11/07 | Last, First | 111-22-3333 | 06/11/07 | download | 3,8,9 | edit |
| 06/11/07 | Last, First | 111-22-3333 | 06/11/07 | n/a | 3,8,9 | edit |
| 06/11/07 | Last, First | 111-22-3333 | 06/11/07 | download | 3,8,9 | edit |
| 06/11/07 | Last, First | 111-22-3333 | 06/11/07 | download | 3,8,9 | edit |

PREVERIFY CONTENT

PREVERIFY CONTENT

PREVERIFY CONTENT

FIG 9D

Welcome, [data provider name]!

| 1 = Education History | 4 = Address History | 7 = Civil/Bankruptcy Records | 10 = Regulatory Sanctions |
| 2 = Driving Record | 5 = Employment History | 8 = Professional Licences/Certs | |
| 3 = Credit Report | 6 = Criminal Background | 9 = References Check | |

Applicants | My Account

ACCOUNT NAME

First Name

Last Name

[ save ]

CHANGE EMAIL

Current Email (your username)

New Email (this will be your new username)

Confirm New Email

[ save ]

CHANGE PASSWORD

Old Password (8-20 characters)
**********************

New Password (8-20 characters)
**********************

Confirm Password
**********************

[ save ]

PREVERIFY CONTENT

PREVERIFY CONTENT

PREVERIFY CONTENT

SYSTEM AND METHOD FOR AUTHORIZATION AND DISCLOSURE FOR BACKGROUND INFORMATION SEARCHES

CROSS-REFERENCE TO RELATED APPLICATION(S)

This application claims the benefit of U.S. Provisional Application Nos. 61/138,120 and 61/170,514, filed Dec. 16, 2008 and Apr. 17, 2009, respectively, herein incorporated by reference.

FIELD OF THE INVENTION

The present invention relates generally to information sharing systems and more specifically Internet based employment opportunity and resume listing systems and computerized personal background information search systems.

BACKGROUND OF THE INVENTION

There exist methods for providing interactive websites listing available employment opportunities and storing prospective employee resume and contact information. These prior methods are limited because they do not adequately filter prospective applicants and result in employers receiving a large pool of applicants not optimally matched to the listed opportunity. These prior methods are also limited because highly qualified applicants are indistinguishable within the automated part of the employment screening process from those applicants who misrepresent their background and qualifications.

There also exist methods for performing personal background information search and verification services. These methods involve varying levels of automation, however, they are limited by the lack of security and inefficiency in their manual authorization and data sharing components. In particular, existing automated methods do not include a way to provide a requestor with verified personal background information search results while maintaining secrecy about the target individual's highly sensitive personal information such as social security number and date of birth. Existing automated methods also fail to provide tools for the secure and efficient reuse and sharing of previously purchased background information reports.

There also exist methods for manual verification of employment, educational history, personal references or other information that may not be available from commercial data providers. These methods are time consuming and fail to provide control or transparency to a prospective employee.

SUMMARY OF THE INVENTION

The invention relates to a software component system and method for more accurate matching of applicants to jobs and more effective and efficient filtering of applicants for requisite qualifications, as well as a system and a method for simplifying, coordinating, and minimizing the risk associated with requesting, sharing, and providing verified personal background information.

Some embodiments of the present invention include interaction between an Internet job board, an employer portal, a member portal, and a data (or background search) portal. In many embodiments, the system receives information from Internet job boards when applicants respond to an employment opportunity listed there. The system then tracks and displays applicant information providing the current status of each application for employers, and automatically communicates with applicants to gain their authorization to perform background checks. In some embodiments, part or all of the application tracking may be performed through a third-party applicant tracking system. As a result, background checking (or preverification) and initial applicant willingness screening can be performed before an employer invests time, energy, and money in the manual screening process.

Some embodiments of the present invention include systems for automated employment history, education history, or personal reference verification. In these embodiments, members or prospective applicants provide information about their employment or education history and also identify verification contacts who can be contacted to verify the accuracy of the information the member or prospective applicant has provided. The verification contacts may then be automatically contacted by email, text message, telephone, or other automated means and requested to fill out a form to verify particular information. When a verification contact submits a verification form back to the system, the prospective employer and the prospective applicant are notified. These embodiments may also include the ability for the prospective applicant or the system to automatically follow-up with the verification contact if no response is received.

An embodiment of the present invention provides an automated method for verification of employment history regarding a job applicant, the method including receiving information identifying an applicant, receiving employment history information for the job applicant, receiving information identifying a contact for verification of the employment history information, automatically providing identified verification contact with a question pertaining to employment history information, receiving an answer from an identified verification contact and storing the answer.

Another embodiment of the present invention provides an automated method for minimizing human review of employment applications from a pool of applicants, the method including receiving employment application information, providing an automated request to an applicant for authorization to process the application, receiving a response to the request for authorization, narrowing the pool of applicants to those who have provided a response.

Some embodiments of the present invention include interaction between members and other members or users in which a first individual who is interested in learning about the background of a second individual sends a request through the system asking the second individual to sign up and purchase a particular preverification report (or background check) and share it with the first individual. The system manages these requests and the permission process, providing tools for the second individual to purchase the preverification report, automatically coordinating the order and delivery process with a data provider, and providing tools for the second individual to authorize the first individual to review the preverification report.

An embodiment of the present invention provides an automated method for the preverification of individual personal information, the method including providing a computer interface for use by a first individual to receive personal information pertaining to a second individual over a network, providing a computer interface for use by a second individual to provide personal information over a network, providing a computer interface for use by data vendors to provide personal information pertaining to a second individual over a network.

In another embodiment the invention relates to an automated system for researching or sharing personal information including: a network interface; a member database accessed through a network interface by the member, the employer, or the data provider and storing member information; and an employer database accessed through the network interface by the employer, the member, or the data provider and storing employer information; and a background search request database accessed through the network interface by the data provider and storing orders for preverification reports; and an auxiliary information database accessed through the network interface by the member, the employer, or the data provider and storing system or other information; and a server coupled to the member database, employer database, background search request database, and auxiliary information database wherein the server is configured to provide a computer interface for use by a first individual to receive personal information pertaining to a second individual over a network, provide a computer interface for use by a second individual to provide personal information over a network, and provide a computer interface for use by data vendors to provide personal information pertaining to a second individual over a network.

In another embodiment the invention relates to a server for an automated personal information research or sharing system, the server including: a processor; and memory operably coupled to the processor storing program instructions therein, the processor being operable to execute the program instructions, the program instructions including: providing a computer interface for use by a first individual to receive personal information pertaining to a second individual over a network; providing a computer interface for use by a second individual to provide personal information over a network; providing a computer interface for use by data vendors to provide personal information pertaining to a second individual over a network.

BRIEF DESCRIPTION OF THE DRAWINGS

FIG. 2 is a schematic block diagram illustrating the interaction between the databases and web portals according to an embodiment of the present invention;

FIG. 3 is a schematic block diagram and flow diagram depicting an expected interaction between members, employers, and data providers within the system according to an embodiment of the present invention;

FIG. 4A is a flow chart illustrating the member authentication and account creation process according to an embodiment of the present invention;

FIG. 4C is an illustration of information presented to an unauthenticated user on the member landing page according to an embodiment of the present invention;

FIG. 4D is an illustration of a sample member profile according to an embodiment of the present invention;

FIG. 4F is an illustration of an account login interface presented to an unauthenticated user who has elected to login according to an embodiment of the present invention;

FIG. 4H is an illustration of an account activation message presented to a user upon successful completion of the account registration process according to an embodiment of the present invention;

FIG. 5B is a flow chart illustrating a member preverification report order and management process according to an embodiment of the present invention;

FIG. 5C is an illustration of a preverification report order and management interface within an authenticated member portal according to an embodiment of the present invention;

FIG. 5D is an illustration of information presented to an authenticated member during a preverification report order process according to an embodiment of the present invention;

FIG. 5E is an illustration of an order confirmation presented to an authenticated member during a preverification report order process according to an embodiment of the present invention;

FIG. 5F is an illustration of information in an education history preverification report as presented to a user according to an embodiment of the present invention;

FIG. 5G is an illustration of information in an employment history preverification report as presented to a user according to an embodiment of the present invention;

FIG. 5I is an illustration of information in a driving record preverification report as presented to a user according to an embodiment of the present invention;

FIG. 5J is an illustration of information in an address history preverification report as presented to a user according to an embodiment of the present invention;

FIG. 5K is a flow chart illustrating a member permissions management process according to an embodiment of the present invention;

FIG. 5L is an illustration of a permission management interface within an authenticated member portal according to an embodiment of the present invention;

FIG. 5N is an illustration of a rewards and offer interface within an authenticated member portal according to an embodiment of the present invention;

FIG. 5O is an illustration of a news display system according to an embodiment of the present invention;

FIG. 5P is an illustration of an account management interface within an authenticated member portal according to an embodiment of the present invention;

FIG. 6A is a flow chart illustrating a employment verification preverification report order process according to an embodiment of the present invention;

FIG. 6B is an illustration of an entry interface presented to an authenticated member during a employment verification preverification report order process according to an embodiment of the present invention;

FIG. 6C is an illustration of the information in an email sent to an identified reference during a employment verification preverification report order process according to an embodiment of the present invention;

FIG. 6D is an illustration of a reference survey interface presented to an identified reference during a employment verification preverification report order process according to an embodiment of the present invention;

FIG. 7A is a flow chart illustrating a member search process according to an embodiment of the present invention;

FIG. 7C is an illustration of information presented to an unauthorized viewer in response to a search for a member who exists with the system according to an embodiment of the present invention;

FIG. 7D is an illustration of information presented to a member after another member has requested that additional preverification report information be made available according to an embodiment of the present invention;

FIG. 7E is a an illustration of the preverification report information interface presented to an authorized viewer according to an embodiment of the present invention;

FIG. 8A is an illustration of information presented to an unauthenticated user on the employer landing page according to an embodiment of the present invention;

FIG. 8C is a flow chart illustrating the application filtration process according to an embodiment of the present invention;

FIG. 8D is an illustration of an applicant data interface within an authenticated employer portal according to an embodiment of the present invention;

FIG. 8E is an illustration of a direct invitation interface according to an embodiment of the present invention;

FIG. 8F is an illustration of information in an email sent to applicant as part of the application filtration process according to an embodiment of the present invention;

FIG. 8G is an illustration of information presented to an employer summarizing an applicant's preverification reports according to an embodiment of the present invention;

FIG. 8H is an illustration of a settings management interface within an authenticated employer portal according to an embodiment of the present invention;

FIG. 8J is an illustration of a settings management interface within an authenticated employer portal according to another embodiment of the present invention;

FIG. 8K is an illustration of a settings management interface within an authenticated employer portal according to another embodiment of the present invention;

FIG. 9C is an illustration of an order overview interface within an authenticated data portal according to an embodiment of the present invention;

FIG. 9D is an illustration of an account management system within an authenticated data portal according to an embodiment of the present invention;

Figure 1:
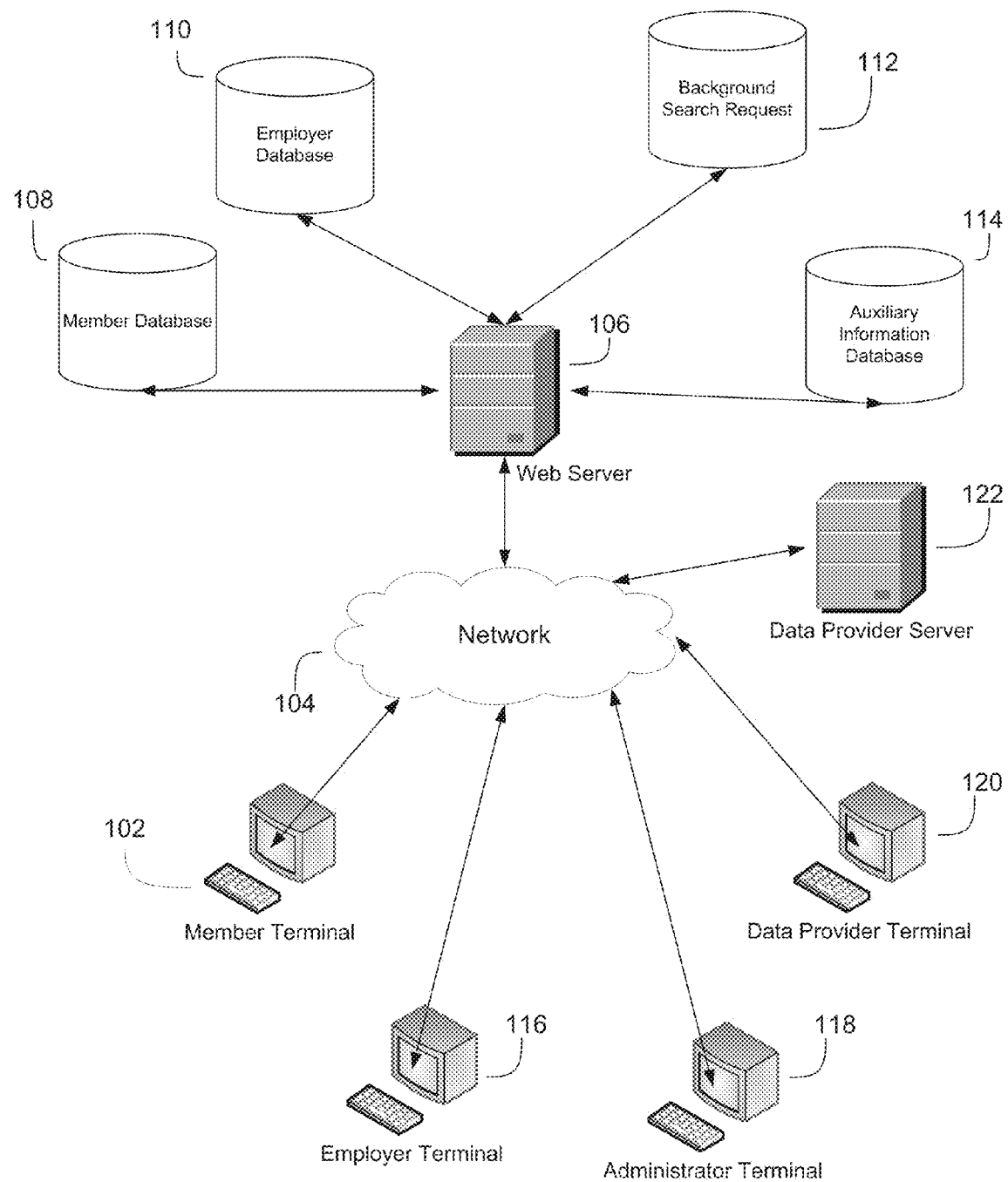
FIG. 1 is a schematic block diagram of a verification system constructed according to an embodiment of the present invention for integrating the automated authorization and disclosure of personal background information searches with the automated management of an employment matching and screening process according to an embodiment of the present invention.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

Turning now to the drawings, embodiments of the present invention that include interaction between an Internet job board, an employer portal, a member portal, and a data portal are shown. An employer portal receives email information submitted by applicants who respond to an employment opportunity listed on an Internet job board. This employer portal tracks and displays applicant information providing the current status of each application. One component of this functionality may be viewed as an applicant tracking system or ATS as that term has become known in the field. In some embodiments, this employer portal incorporates substantial ATS functionality for tracking application information from initial response to a job listing through the entire employment process through termination. In other embodiments, the employer portal allows employers to manage and track the application receiving and background check authorization processes. In yet another embodiment, the employer portal includes tools for defining and managing the interaction between the system and any third-party ATS.

In many embodiments the employer portal manages applications for a single job offering. In other embodiments the employer portal manages applications for more than one job offering. In some embodiments the employer portal manages application submission and/or background check authorization. In other embodiments the employer portal allows the employer to control and manage communication with a third-party ATS. In one aspect of the invention the applicant filtration process automatically narrows the field of applicants by requesting that an applicant confirm willingness to undergo various background checks and consent to particular checks. In many embodiments the applicant filtration process employs a series of email communications and website forms to implement the consent process.

In another aspect of the invention, highly sensitive applicant data such as social security number and birth date is protected because it is not disclosed to an employer during the application process. In many embodiments the sensitive data is retained by the system and provided on a need to know basis to data providers. In other embodiments the system facilitates direct communication between members and data providers and does not collect or store sensitive information.

In another aspect of the invention, members retain access to preverification reports (or particular background checks) already prepared for one purpose, for example in connection with a particular job application, for reuse with other employers or in other contexts such as online dating or educational admissions applications.

A schematic block diagram illustrating an embodiment of the invention for integrating the automated authorization and disclosure of personal background information searches with the automated management of an employment matching and screening process is shown in FIG. 1. As shown in FIG. 1, the system includes a member terminal 102 for member access, over a network 104 to a web server 106. Certain types of access to the web server 106 may be limited by requiring, for example, the submission of a user name and password, for security purposes. The server 106 provides access for a user to a member database 108, an employer database 110, a background search database 112, and an auxiliary information database 114.

The member database 108 stores information such as a member's first and last name and email address, a member's permission settings and associated data, a member's account information such as login, password, and any password retrieval challenge information, a member's advertising and offer preferences and history, information related to a member's order history, pending orders, payment options and additional member profile information. The employer database 110 stores information such as employer name, address, and profile information, employer job offerings, employer confirmation and consent preferences, employer account information, employer contact email information, information about applicants for employer job offerings, pending orders and payment information. The background search database 112 stores information such as orders for background information and the results of background information searches (also known as "preverification reports"), information entered by members in the preverification report order process, data provider preferences and data provider identification information and account information. The auxiliary information 114 stores additional information used in system operations such as information about advertisements and offers, advertiser preference information, news and news organization information, information related to the provision of a job board such as job listings and associated data, and data associated with employment matching and resume management services.

Further the system includes an employer terminal 116 for employer access to a member database 108, an employer database 110, a background search database 112, and an auxiliary information database 114 over a network 104 and the web server 106. The employer terminal 116 allows an employer to manage the pending applications for particular jobs, view detailed information about applicants, request preverification reports for particular applicants, view background information results for particular applicants, manage preferences and account information, and pay bills. In many embodiments of the employer terminal 116, the web server 106 accesses the auxiliary information database 114 to allow the employer to manage interaction with a third-party ATS from the employer terminal 116. In some embodiments the employer may manage the third-party ATS directly through the employer terminal 116. In some embodiments the employer terminal allows the employer to manage the direct or indirect communication between the employer database 110 and any third-party ATS.

Further the system includes an administrator terminal 118 and a data provider terminal 120 for administrator and data provider access respectively to the system databases over a network 104 and the web server 106. The administrator terminal 118 allows an administrator to manage the entire system including user authentication and tracking, to control the advertising and offer systems, to select and promote stories within the news interface, and to review and remove objectionable content posted within member profiles and the job board. The data provider terminal 120 allows a data provider to view and download orders for preverification reports, enter and submit or upload the results of preverification searches, and manage accounting information associated with payment for services.

The system also includes a data provider server 122 that contains background information data provided directly by data providers to the system via the automated preverification report order fulfillment back end.

FIG. 2 is a schematic block diagram illustrating the interaction between the databases and web portals according to an embodiment of the present invention. As shown in FIG. 2, in one embodiment of the invention, the data is stored within MySQL databases 202, 204, 206 and the member portal 208, accessible through the member terminal 102 is implemented using PHP, as are the Employer portal 210, accessible through the employer terminal 116, and the data portal 212, accessible through the data provider terminal 120.

FIG. 3 is a schematic block diagram and flow diagram depicting an expected interaction between members, employers, and data providers within the system according to an embodiment of the present invention. As FIG. 3 depicts, in one embodiment of the invention, a candidate (or applicant) 302 finds a job posted on an Internet job board 304 and submits an application through the board 306. The Internet job board 304 may be provided by a third-party such as an employer or another company that provides employment services. The system then stores applicant data within the employer database 306 [204/110] and also initiates a consent process with the applicant as illustrated 308. An employer may use the employer portal 310 [210] to review applicant information. Part or all of the ATS component of the employer portal 310 may be provided by a third-party. An employer may select applicants for further background checking (or preverification) 312. When an employer so selects, the resulting preverification report orders are passed to the background search database 314 and results are returned to the system as they are prepared by a data provider 316. Results are also made available to the applicant through the member portal 318 [208] where they may be shared with other users 320, posted to the system job board 322 and accessed by other prospective employers 324.

Figure 4B:
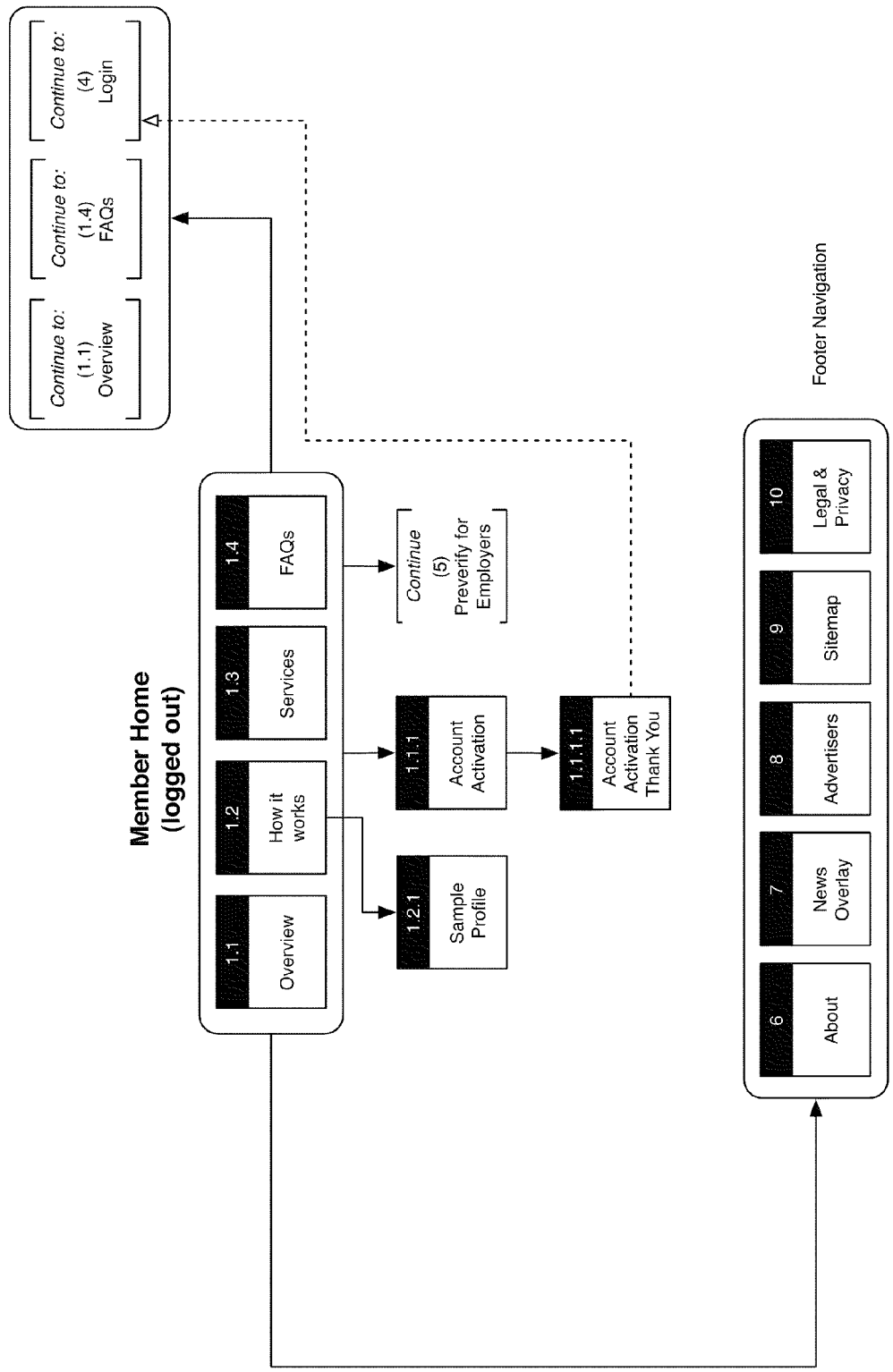
FIG. 4B is a schematic block diagram illustrating the navigation options of an unauthenticated user within the system according to an embodiment of the present invention.
Figure 4E:
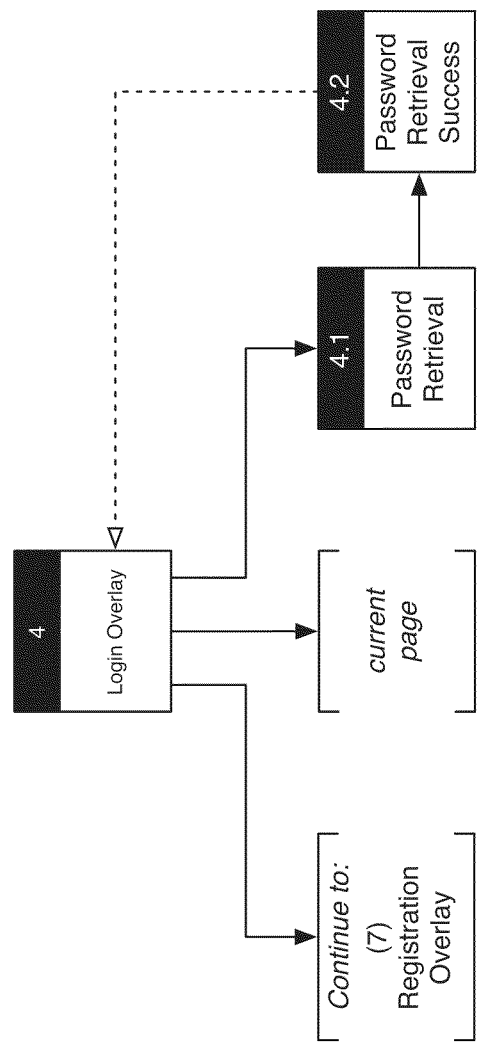
FIG. 4E is a schematic block diagram illustrating navigation options available within the login system according to an embodiment of the present invention.
Figure 4G:
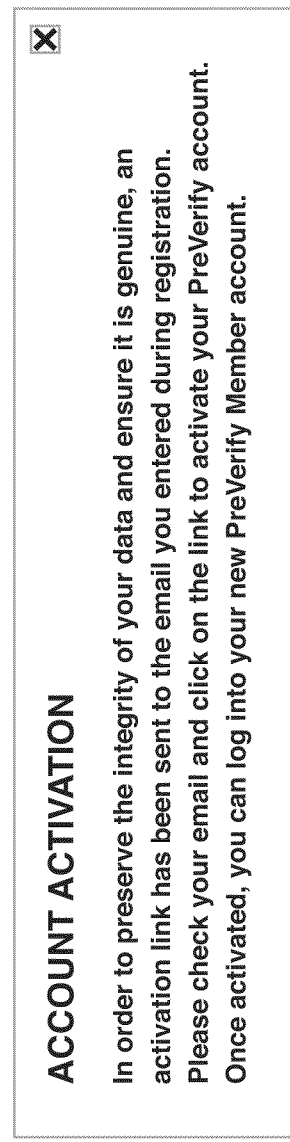
FIG. 4G is an illustration of an account activation message presented to a user during the account registration process according to an embodiment of the present invention.
Figure 4I:
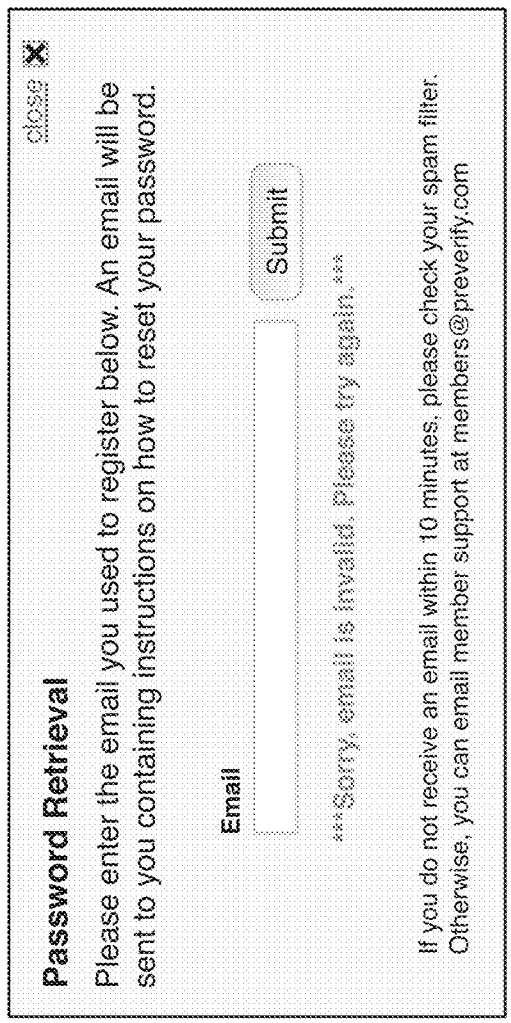
FIG. 4I is an illustration of a password retrieval interface presented to an unauthenticated user during the password retrieval process according to an embodiment of the present invention.
Figure 5A:
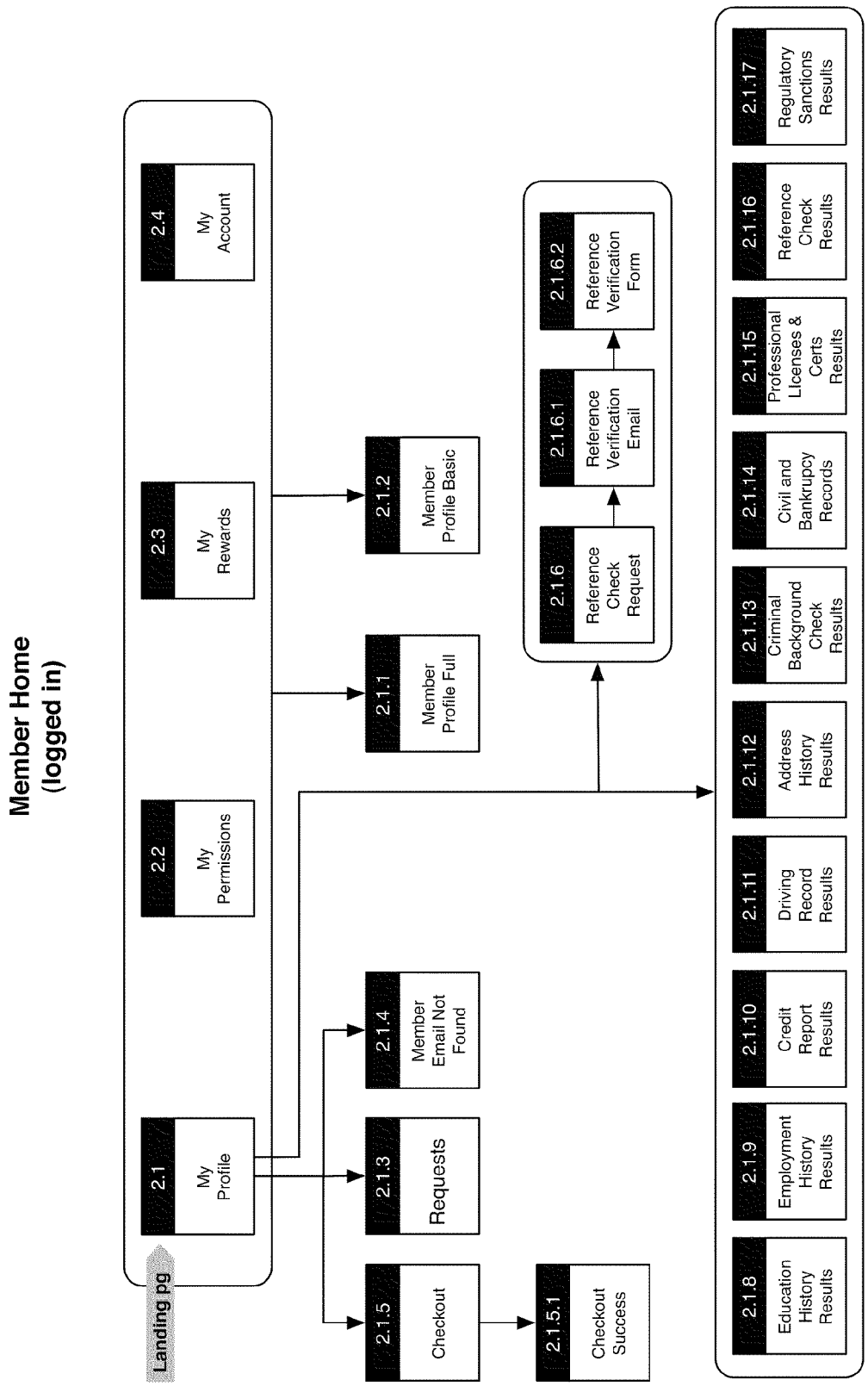
FIG. 5A is a schematic block diagram illustrating navigation options within an authenticated member portal according to an embodiment of the present invention.

FIG. 4A is a flow chart illustrating the member authentication and account creation process according to an embodiment of the present invention. As FIG. 4A depicts, the system provides access to an interface available to unauthenticated users 402 interested in accessing the member profile management interface. According to one embodiment of the invention, this access is provided through a website landing page targeted at prospective members. FIG. 4B is a schematic block diagram illustrating the navigation options of an unauthenticated user within the system according to an embodiment of the present invention. FIG. 4C is an illustration of information presented to an unauthenticated user on a member landing page including marketing material promoting the site 404 and an area that allows a user to create an account or log in 406 according to an embodiment of the present invention. The unauthenticated user may also navigate from this page to view a sample member profile. FIG. 4D is an illustration of a sample member profile according to an embodiment of the present invention. Returning to FIG. 4A, the system then prompts a user to login or create an account 408, and if the user is an existing member then the user may attempt to login. FIG. 4E is a schematic block diagram illustrating navigation options available within the login system according to an embodiment of the present invention. FIG. 4F is an illustration of an account login interface presented to an unauthenticated user who has elected to login according to an embodiment of the present invention. If a user attempts to login 410, but is unsuccessful, the user has the option to retrieve the correct password 412 through the password retrieval process 414. FIG. 4I is an illustration of a password retrieval interface presented to an unauthenticated user during the password retrieval process according to an embodiment of the present invention. If a user is not an existing member, the user may elect to create an account 416, this election initiates the account creation process 418. FIG. 4G is an illustration of an account activation message presented to a user during the account registration process according to an embodiment of the present invention. FIG. 4H is an illustration of an account activation message presented to a user upon successful completion of the account registration process according to an embodiment of the present invention. After successfully retrieving a password 414 or creating an account 418, the user may then attempt to login 410 and if successful, the user gains access to the authenticated member profile management interface (or portal) 420. FIG. 5A is a schematic block diagram illustrating navigation options within an authenticated member portal according to an embodiment of the present invention. Within the member profile management interface the member may select among several navigation options by selecting the "My Account" tab 422 to enter the account management process 424, or by selecting the "My Rewards" tab 426 to enter the rewards and offers management process 428, or by selecting the "My Preverify" tab 430 to enter the preverification management process 432 wherein the member may view third party requests for particular preverification reports and may elect to purchase particular preverification reports. By selecting the "My Permissions" tab 434 to enter the permission management process 436. In one embodiment of this permissions management process, a member may allow particular individuals access to their entire collection of preverification reports on a member basis. In another embodiment of this process, particular preverification reports are managed individually and access to each preverification report may be controlled at the report or preverification category level.

Figure 5D:
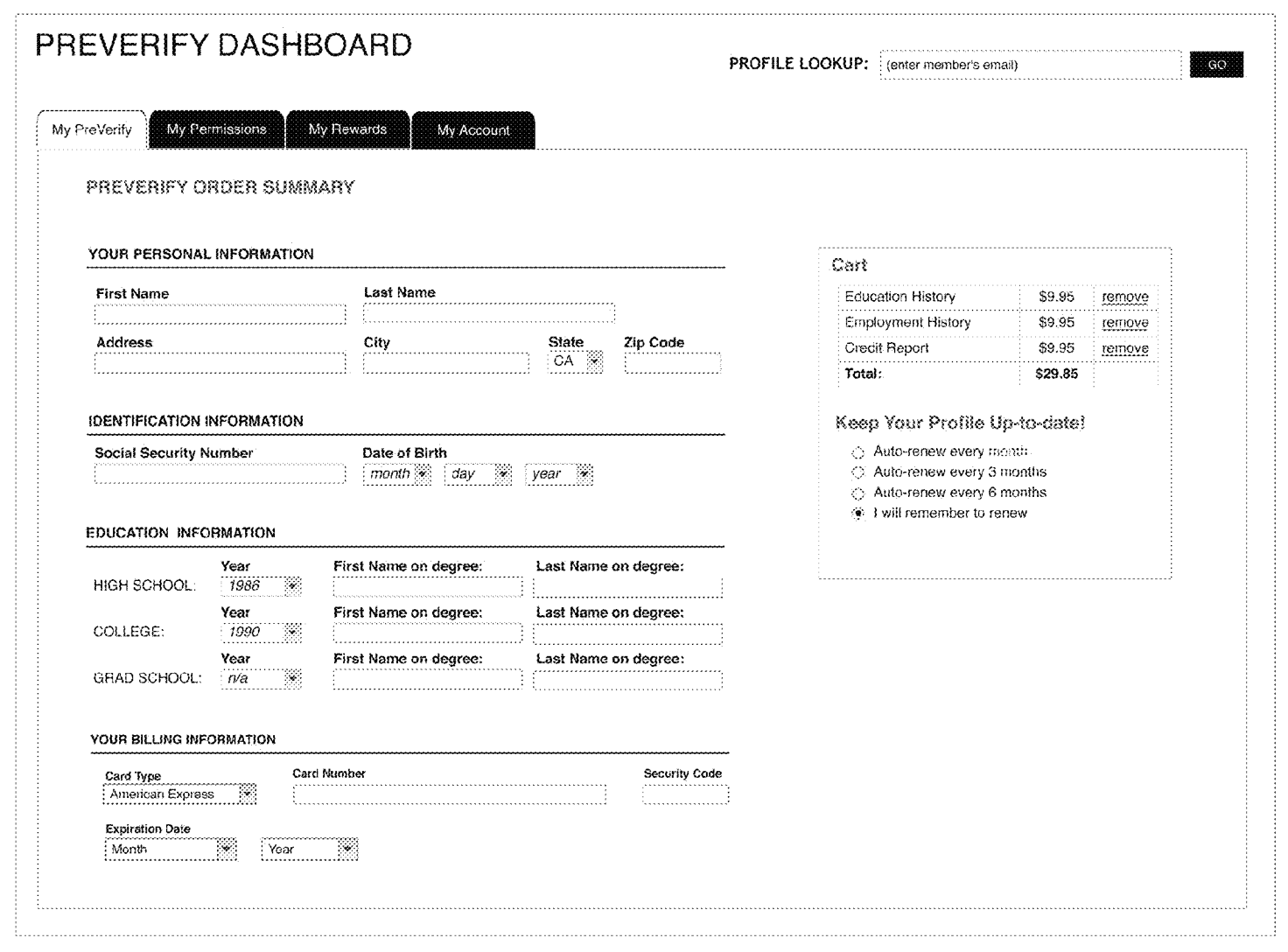
Figure 5H:
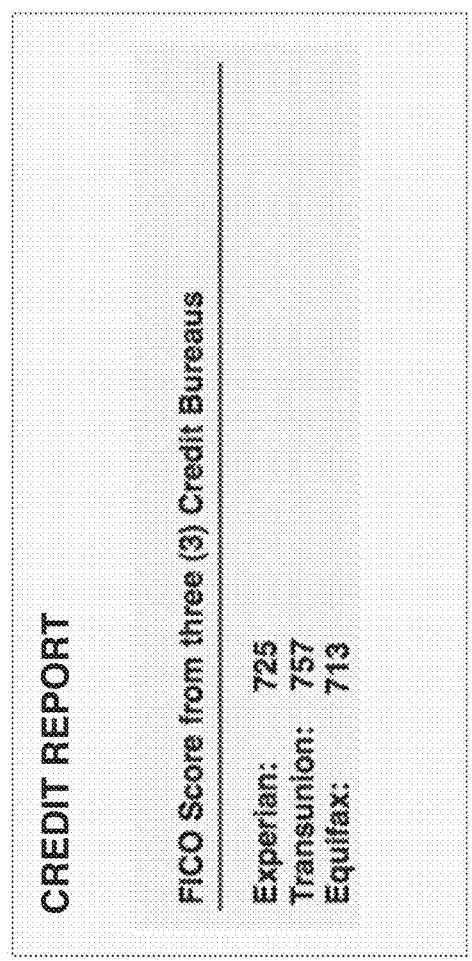
FIG. 5H is an illustration of information in a credit report preverification report as presented to a user according to an embodiment of the present invention.

FIG. 5B is a flow chart illustrating a member preverification report order and management process according to an embodiment of the present invention. As FIG. 5B depicts, the system provides access to a member preverification management interface 510. FIG. 5C is an illustration of a preverification report order and management interface within an authenticated member portal that shows the display information indicating the presence of preverification report requests by third parties 512, prices for the purchase of particular preverification reports 514, an interface to allow a member to select and purchase particular preverification reports 516 according to an embodiment of the present invention. Returning to FIG. 5B, if the system has stored a preverification report request for a member 518 and the member elects to view the requests 520, the system may present information about the parties requesting access to preverification report details 522 and then prompt the member to authorize or deny access within the permission management interface 524. If the member places an order for a preverification report 526, the system presents an additional interface 528 that allows the member to enter necessary information including payment information 530. FIG. 5D is an illustration of information presented to an authenticated member during a preverification report order process according to an embodiment of the present invention. For some preverification report orders, the information that a member is required to enter is more extensive than just payment information. For example, if a member orders an educational history or employment history preverification report, the member may be required to enter additional background or reference information for verification by the data provider. FIG. 6B is an illustration of an entry interface presented to an authenticated member during a employment verification preverification report order process according to an embodiment of the present invention. Returning to FIG. 5B, if a member successfully enters an order, the system enters information into the member database and the background search database 532, it sends a confirmation of the order to the member 534, and it alerts the data provider to the presence of a new order 536. FIG. 5E is an illustration of an order confirmation presented to an authenticated member during a preverification report order process according to an embodiment of the present invention. When the data provider completes the preverification report order 538, the member and background search databases are updated 540 to reflect the presence of a complete preverification report and the contents of the preverification report. The member is alerted that the order is complete 542, and if the order was requested by another user 544, for example an employer, that requestor is also alerted to the completion of the preverification report order 546. If the member or requestor elects to view the requested preverification report the system displays the report and allow the user to print it. FIG. 5F is an illustration of information in an education history preverification report as presented to a user according to an embodiment of the present invention. FIG. 5G is an illustration of information in an employment history preverification report as presented to a user according to an embodiment of the present invention. FIG. 5H is an illustration of information in a credit report preverification report as presented to a user according to an embodiment of the present invention. As can be seen in FIG. 5H, in some embodiments of the invention, the credit report information presented to a requestor may be minimal, and may not disclose sensitive personal information such as bank account information and social security number. In other embodiments of the invention, more information is disclosed, nonetheless, some sensitive personal information never disclosed to a requestor, for example the member's social security number. FIG. 5I is an illustration of information in a driving record preverification report as presented to a user according to an embodiment of the present invention. FIG. 5J is an illustration of information in an address history preverification report as presented to a user according to an embodiment of the present invention.

FIG. 5K is a flow chart illustrating a member permissions management process according to an embodiment of the present invention. As FIG. 5K depicts, the system provides a member permission management interface 548 that allows members to invite non-members to view their existing preverification reports by signing up with the system, and also allows members to manage pending requests for authorization to view that member's profile. FIG. 5L is an illustration of a permission management interface within an authenticated member portal according to an embodiment of the present invention. As can be seen from FIG. 5L, this interface presents two interactive areas, one "Invited List" area 550 that allows management of invitations, and another "Requests" area 552 that allows management of pending requests. Returning to FIG. 5K, if a member uses the features of the "Invited List" area 550 to enter an email address of an individual to invite to view the member's existing preverification reports 554, then the system updates the member database to reflect a newly invited individual associated with that particular member's record 556, the system checks to determine whether the invited individual is already a member of the system 558. If the individual is not an existing member 560, then the system sends an email invitation to the invited individual 562, and if the invitee signs up 564, then the system creates a new member profile 566. Either after the system creates a new profile 566, or in the case where the invited individual was already a member 560, the system then adds an entry to the member database reflecting the authorization for the invited member to view the inviting member's preverification reports 568. If a member has pending requests by third parties 570 for authorization to view that member's preverification reports, the member may use the features of the "Requests" area 552 which is essentially an approval tool 572. From the approval tool 572, a member may view all requests for authorization and may elect to approve 574 or deny 576 a particular request. If a request is approved 574, then notification of the approval is sent to the requestor 578, and the member database is updated to reflect the new permissions 580. If the request is denied 576, then notification of the denial is sent to the requestor 582 and the database is updated to reflect the new non-authorization 584. In the case of non-authorization, the information is stored so that it may be used to screen out an individual who makes multiple requests for authorization, and to allow a member to avoid repeated review.

Figure 5M:
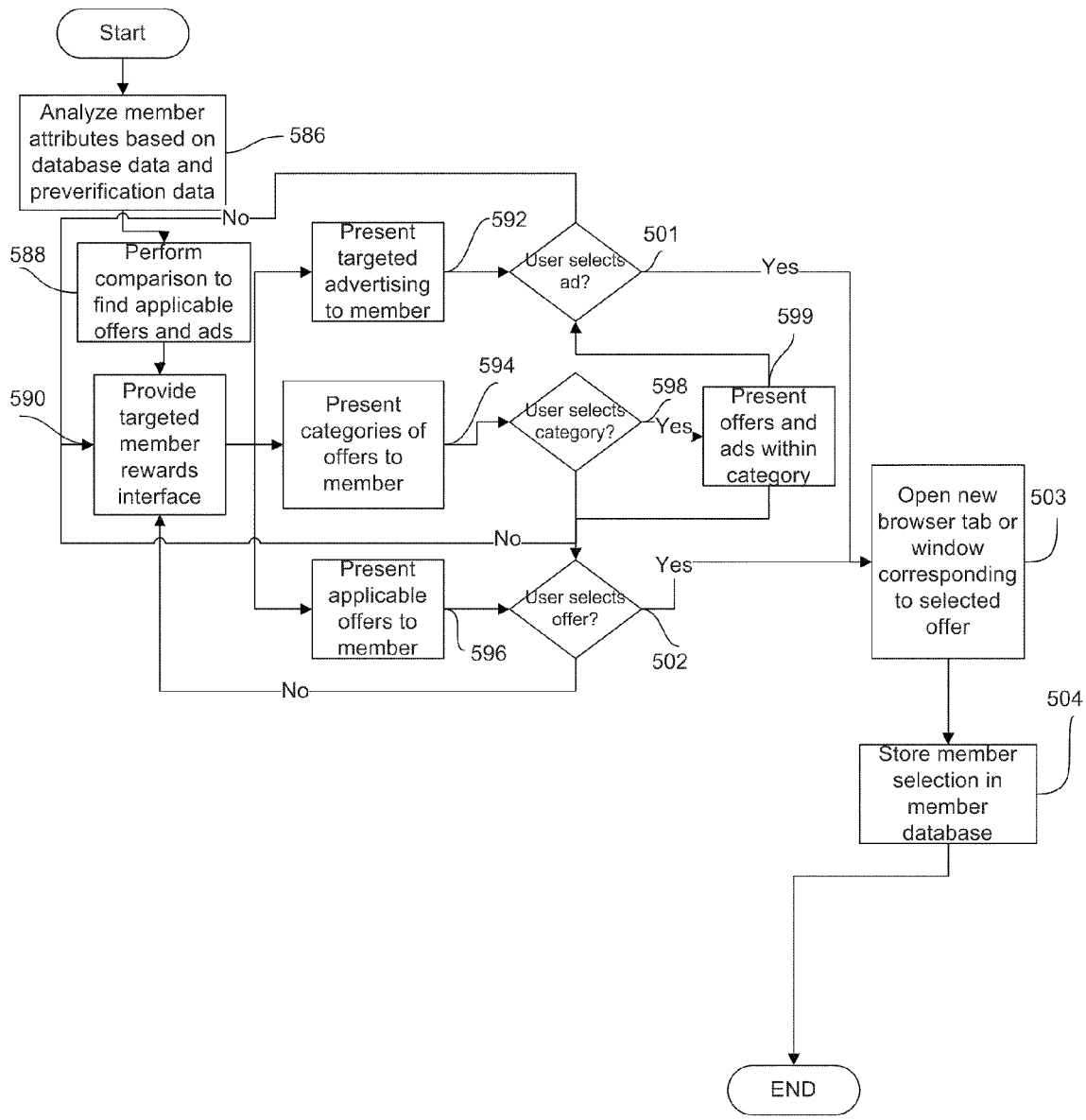
FIG. 5M is a flow chart illustrating a member rewards and offers management process according to an embodiment of the present invention.

FIG. 5M is a flow chart illustrating a member rewards and offers management process according to an embodiment of the present invention. As depicted in FIG. 5M, the first step in this process is the constant analysis of member attributes, history, and data 586 with an eye toward targeting proper advertisements and offers to particular members. Having identified and analyzed member information, the system then performs a matching process by comparing available offers and advertisements to the attributes of each member 588. Once the advertisements and offers are associated with each member, the system provides a targeted member rewards interface 590. FIG. 5N is an illustration of a rewards and offer interface within an authenticated member portal according to an embodiment of the present invention. As FIG. 5N shows, a member within the offer interface of an authenticated member portal is presented with a series of categories 590A that allow the member to select particular areas of interest, the member is also presented with a series of offers 590B from particular institutions. For example, as the illustrations depicts, these offers may be offers from financial institutions to open bank or brokerage accounts, or they may be credit card offers. Within this interface, a member is also presented with targeted advertisements 590C that were identified through the matching process 588 discussed above. Within this interface a member is also presented with a visual data representation 590D that indicates some information about the member and explains how this information is related to the offers presented. In the embodiment of the invention illustrated in FIG. 5N the information presented about the member reflects the number of preverification reports the member has purchased. In other embodiments, this visual data representation 590D may reflect information such as the average credit score of the member, or the interactivity, or loyalty, or stability score of the member. Or any other quality of the member or the member's behavior that can be described on the basis of data collected by the system. Returning to the flow chart of FIG. 5M, from the member rewards interface 590, the system presents targeted advertising 592, categories of offers 594, and preselected offers 596 to the member. If the user elects a category of offer 598 by selecting an offer presented within the category lists 590A, the system presents advertisements and offers related to that category of goods or services. If a user selects an offer 502 or advertisement 501 from the interface, either after selecting a category 598 or at the initial entry into the interface, the system opens a new area to display additional information corresponding to the selected offer 503. In some embodiments this area may be a new web browser window or tab. The system also stores a record that the member selected that offer or advertisement 504 to assist with better advertisement and offer targeting in the future.

FIG. 5P is an illustration of an account management interface within an authenticated member portal according to an embodiment of the present invention. Within this interface a member may manage information about their account such as name, email, and password. It will be appreciated by those of skill in the art that, in other embodiments of the present invention, other information pertaining to a member is managed using this interface.

FIG. 5O is an illustration of a news display system according to an embodiment of the present invention. This news display system is available to authenticated and unauthenticated users of the system and contains news stories related generally to employment and verification issues.

FIG. 6A is a flow chart illustrating a employment verification preverification report order process according to an embodiment of the present invention. As FIG. 6A depicts, if a member initiates a employment verification preverification report, the system receives the request 610 and prompts the member to enter additional information pertaining to the employment verification 612. FIG. 6B shows an illustration of the type of interface presented to the member to enter employment verification contact information according to one embodiment of the invention. If the member submits complete information to allow the system to perform the employment verification 614, the system automatically sends email messages to the contacts identified by the members. FIG. 6C is an illustration of the information in an email sent to an identified contact during a employment verification preverification report order process according to an embodiment of the present invention. As can be observed from this illustration, the identified contact individual is presented with a link to the system, which may be selected in order to complete a detailed survey. If the contact individual selects this link 618, then the system presents a survey interface to allow the contact individual to enter information about the member requesting the employment verification. FIG. 6D is an illustration of an employment verification survey interface presented to an identified contact during an employment verification preverification report process according to an embodiment of the present invention. Within the survey interface the identified contact may be presented with questions that allow him to enter both qualitative and quantitative information about the member. This information may be used in the instant hiring process, and may be stored for use in searching for candidates on a job board. For example, a verification contact may indicate that a particular member is fluent in multiple languages and this information may be stored and become available for searching within a job board. If the contact individual completes the survey 622, the system automatically sends the reference a thank you message 624 and stores the data provided within the survey process 626 in the background search 112 and member 108 databases. The system further alerts the member that the employment verification inquiry has received a response. FIG. 6A through 6D illustrate the process of automated verification of employment history. The same methodology for automated verification may be employed with respect to personal references, education history, or any other background information. This verification process may be used to replace data provided by a commercial data provider, or to supplement or confirm such data.

Figure 7B:
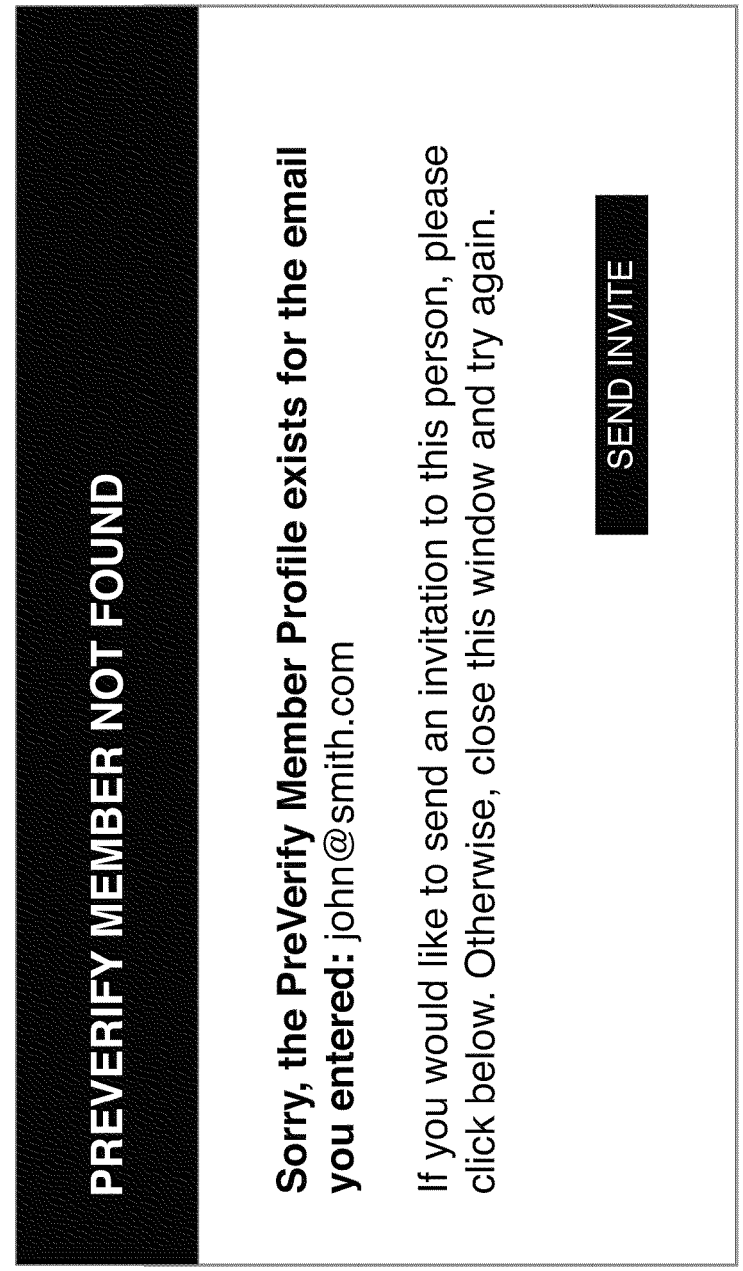
FIG. 7B is an illustration of information presented in response to a search for a member who does not exist within the system according to an embodiment of the present invention.

Several figures depict the authenticated member portal and the interfaces within this portal. For example FIGS. 5C, 5D, 5F, 5L 5N, and 5P all show a "Profile Lookup" box in the upper right corner of the illustrated screen. FIG. 7A is a flow chart illustrating a member search process that occurs when an authenticated member uses the "Profile Lookup" box to search for another member according to an embodiment of the present invention. As depicted in FIG. 7A, the system provides a member search interface 710 that receives a search query entered into the "Profile Lookup" box. The system then attempts to find a member profile 714 associated with the search query within the member database. If no profile is found, the system presents a profile not found message 716 and provides the searcher an opportunity to send an invitation to the person searched for 718. FIG. 7B is an illustration of information presented in response to a search for a member who does not exist within the system according to an embodiment of the present invention. If the searcher elects to send an invitation 718, then the system sends an invitation to the email address searched on behalf of the prospective member 720. If the search results in the system finding a member profile for the target of the search 714, then the system determines whether the searcher is already authorized to view the preverification report information of the member searched 722. If the searcher is not authorized to see the target's preverification report information, then the system presents to the searcher a limited information screen 724 that indicates that the target is a member and shows what preverification reports already exist for the target. FIG. 7C is an illustration of information presented to an unauthorized viewer in response to a search for a member who exists within the system according to an embodiment of the present invention. As this illustration shows, some information is available to the searcher, for example the details of which preverification reports have been purchased and when they were last updated, however, all of the detailed information in the preverification reports is not accessible. As this illustration also shows, the searcher is presented with a box that allows a request for permission to view to be transmitted to the searched member. Returning to FIG. 7A, if the searcher requests authorization, the system sends an email to the searched member alerting the member to the request for authorization 728. If authorization is subsequently provided 730, or if the searcher was already authorized 722 when the target was located, then the system presents the searcher with the member preverification information interface. FIG. 7E is an illustration of the preverification information interface presented to an authorized viewer according to an embodiment of the present invention. As the illustration shows, this interface allows an authorized viewer to request additional preverification reports that are not presently available within the searched member's profile by checking the "Request" select box on the right side of the illustration. If additional preverification reports are requested, the system sends an alert to the searched member taking the form of FIG. 7D, which is an illustration of information presented to a member after another member has requested that additional preverification information be made available according to an embodiment of the present invention.

Figure 8B:
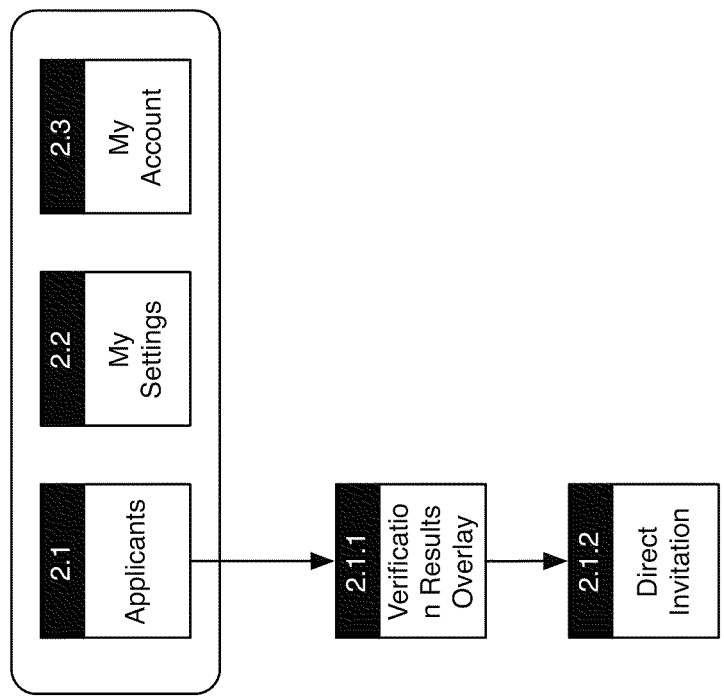
FIG. 8B is a schematic block diagram illustrating navigation options within an authenticated employer portal according to an embodiment of the present invention.

As discussed above with respect to FIG. 3, a key component of the interaction within the invention is the application filtration process that is depicted to some extent in FIG. 3. FIG. 8C is a flow chart that shows the application filtration process in greater detail according to an embodiment of the present invention. As depicted in FIG. 8C, the system also provides a separate employer portal 310 that includes an application management interface 810 to allow employers to manage all of the information about all of the applicants for a particular job in one place. When an employer creates a new job listing 812, the system assigns an email address to that listing 814. That email address is used by the employer (or the employer's HR department) as the contact email for all job listings posted on Internet job boards 816. As reflected in FIG. 3, the Internet job boards may be provided by third parties outside of the system 304 or may be the job board provided within the system, identified in FIG. 3 as the "PreVerify Job Board." 322. The use of the system assigned email address, means that when an applicant applies to a job through one of the job boards 818, and an automatic email is sent to the employer contact who listed that job, it can be received by the system of the invention 220. When the system receives this emailed applicant information, it parses the email header files and body to acquire data pertaining to the applicant and store that data in the employer database 822. This data can then be viewed by the employer through the applicant data interface within the authenticated employer portal. FIG. 8D is an illustration of an applicant data interface within an authenticated employer portal according to an embodiment of the present invention. Returning to FIG. 8C, after the applicant data has been entered into the employer database and is available for viewing through the employer portal, the application filtration process commences. The first step of the application filtration process is when the system automatically sends a confirmation email to the applicant in response to the applicant's application submission 824. FIG. 8F is an illustration of information in an email sent to applicant as part of the application filtration process according to an embodiment of the present invention. If the applicant confirms a willingness to move forward with the process 826 that the applicant has been informed may involve various levels of background checking and verification of resume details, then the system updates the applicant's status to "confirmed" within the employer database and portal 828. In the next step of the filtration process, the employer initiates the sending of a request for consent email to the applicant 830, requesting the applicant's consent to particular background searches (or the creation of preverification reports), and requesting that the applicant enter necessary information to allow those preverification reports to be obtained. For example, to perform a credit check the system may request that the applicant enter a full name, a social security number, and a date of birth. If the applicant consents to particular preverification reports and enters the necessary information 832, the system updates that applicant's status to "consented" within the employer database and portal 834. In some embodiments this "consented" status is updated in the employer database 110. In some embodiments the "consented" status is communicated through an automatic, manual, or applicant assisted process to a third-party ATS. Once an applicant has provided full consent to being preverified, the employer may review the applicant's complete information 836 to decide whether to purchase preverification reports for that applicant. At this point in the process the system allows the employer to purchase preverification reports for that applicant. If the employer elects to purchase preverification reports for that applicant 838, the applicant status in the employer database is updated to "pending" 840 and the preverification report orders are transmitted to data providers 842. When the data providers return results 844 the applicant status in the employer database and portal is updated to "preverified" 846 and notice is sent to the applicant 848 and the employer 850 that the preverification reports may be viewed within the system. FIG. 8G is an illustration of information presented to an employer or applicant summarizing an applicant's preverification data according to an embodiment of the present invention.

As the illustration of FIG. 8D shows, an employer may also send a direct invitation to a particular candidate to apply for a job within the system. To do this, an employer selects the field labeled "Send Direct Invite" in the upper right corner of the illustration of FIG. 8D. When an employer selects this option, the employer may then enter individual applicant information directly into an interface for sending direct invitations. FIG. 8E is an illustration of a direct invitation interface according to an embodiment of the present invention.

FIG. 8H is an illustration of a settings management interface within an authenticated employer portal according to an embodiment of the present invention. As this illustration depicts, an employer has the option to select varying levels of consent required for it's job offerings. In this interface the employer may also define what information is to be included in the auto-response and direct invitation emails.

Figure 8I:
FIG. 8I is an illustration of an account management interface within an authenticated employer portal according to an embodiment of the present invention.

FIG. 8I is an illustration of an account management interface within an authenticated employer portal according to an embodiment of the present invention. As discussed above with respect to the member account management interface, this interface allows management of basic information pertaining to the user (in this case the employer) such as email and password information.

FIG. 8J is an illustration of a settings management interface within an authenticated employer portal according to another embodiment of the present invention. As this illustration depicts, an employer has the option to enter information into the settings management interface to configure communication between the system and a third-party ATS. In addition to the information depicted in FIG. 8J, it is also contemplated that an employer may enter configurations related to the direct communication of data between a system and a third-party ATS over a network.

FIG. 8K is an illustration of a settings management interface within an authenticated employer portal according to another embodiment of the present invention. As this illustration depicts, here an employer has the ability to define with specificity the conditions under which a candidate with an existing record in the system should be presented with a consent communication. This illustration also depicts a feature that allows an employer to block particular applicants based on whether they already have or do not have particular preverification reports in the system. In addition to the information depicted in FIG. 8K, it is also contemplated that the selective consent filtering and blocking tools may respond to what information has been authorized or shared by a candidate rather than what information exists.

Figure 9A:
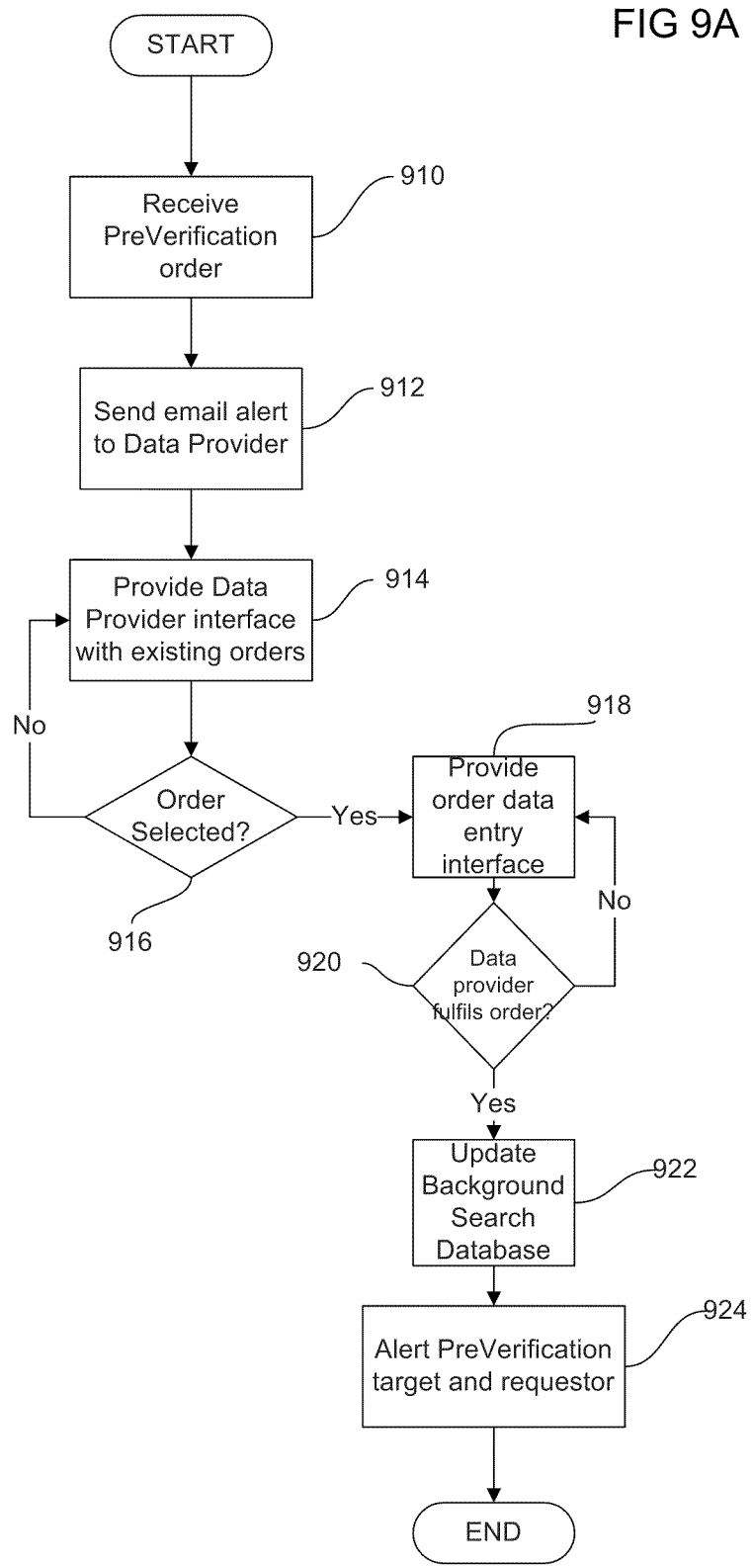
FIG. 9A is a flow chart illustrating the data provider order and fulfillment process according to an embodiment of the present invention.
Figure 9B:
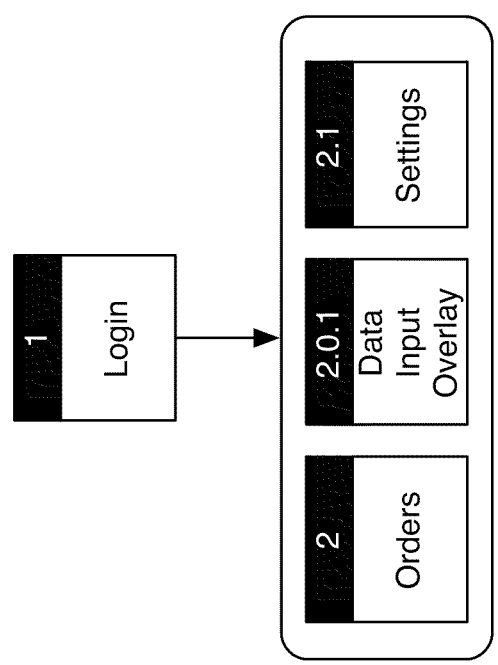
FIG. 9B is a schematic block diagram illustrating navigation options within an authenticated data portal according to an embodiment of the present invention.

FIG. 9A is a flow chart illustrating the data provider order and fulfillment process according to an embodiment of the present invention. As FIG. 9A depicts, when the system receives an order for a preverification report 910, the system sends an email alert to a data provider 912, the system provides an interface to allow the data provider to review and manage existing orders 914. When the data provider authenticates within the data portal, reviews the order interface, and selects an order 916, the system provides a data entry interface 918 to allow the data provider, after performing a particular background search, to enter the results into the system 920. After a data provider enters those results, the system updates the background search database 922 as well as the member and employer databases as necessary, and alerts the requestor and preverification target that the order is complete 924. FIG. 9C is an illustration of an order overview interface within an authenticated data portal according to an embodiment of the present invention. As this illustration shows, the data provider is able to download the resume information from a target and select the edit area to upload results back to the system.

FIG. 9D is an illustration of an account management system within an authenticated data portal according to an embodiment of the present invention. As discussed above this interface allows the user (in this case the data provider) to manage its personal information such as email address and password information.

Although the present invention has been described through the use of exemplary embodiments, it will be appreciated by those of skill in the art that various modifications may be made to the described embodiments that fall within the scope and spirit of the invention as defined by the claims and their equivalents appended hereto. For example, the present invention may be implemented using mobile telephone browser technology and SMS messaging instead of websites and email, it could also be implemented using any technology or system that facilitates the rapid communication of complicated information between parties.

What is claimed is:

1. An automated method for minimizing human review of employment applications from a pool of applicants, the method comprising:
    receiving employment application information for the pool of applicants;
    sending an automated request to each applicant of the pool of applicants for authorization to verify each applicant's corresponding employment application information;
    receiving a plurality of responses to the request for authorization from the applicant pool; and
    filtering the pool of applicants to those applicants who have provided their authorization to verify their employment application information before an employer reviews the employment application information.

2. The method of claim 1, wherein the automated request to each applicant for authorization is sent by email.

3. The method of claim 1, wherein the automated request to each applicant for authorization is transmitted through a website.

4. The method of claim 1, wherein the automated request to each applicant for authorization includes a request for authorization to perform a background check.

5. The method of claim 1, wherein the automated request to each applicant for authorization includes a request for authorization to perform a credit check.

6. The method of claim 1, wherein the automated request to each applicant for authorization includes a request for authorization to perform an employment history verification.

7. The method of claim 1, wherein the automated request to each applicant for authorization is a request for authorization to perform an education history verification.

8. The method of claim 1, wherein the employment application information is received from an applicant tracking system.

9. The method of claim 1, wherein the employment application information is received from an applicant.

10. The method of claim 1, wherein the employment application information is received from a job board.

11. The method of claim 1, additionally comprising:
    transmitting information about the pool of applicants to an applicant tracking system.

12. The method of claim 1, wherein a filtered list of the pool of applicants is selectively presented on a computer display.

13. The method of claim 1, wherein a filtered list of the pool of applicants is transmitted to an applicant tracking system.

14. The method of claim 1, wherein a filtered list of the pool of applicants is transmitted by email.

* * * * *